US009635091B1

(12) United States Patent
Laukkanen et al.

(10) Patent No.: US 9,635,091 B1
(45) Date of Patent: Apr. 25, 2017

(54) USER INTERACTION WITH DESKTOP ENVIRONMENT

(71) Applicant: Chad Dustin Tillman, Matthews, NC (US)

(72) Inventors: Joona Antero Laukkanen, Tampere (FI); Timo Eemeli Nummenmaa, Tampere (FI); Wouter Walmink, Amstenrade (NL); Alexander Wilhelm Maria Barbara Rulkens, Amsterdam (NL); Erkki Antero Savilampi, Kangasala (FI); Jussi Henrikki Lahdenniemi, Kangasala (FI); Timo Jaakko Tapani Elomaa, Pirkkala (FI); Pertti Tapani Saarinen, Lempäälä (FI)

( * ) Notice: Subject to any disclaimer, the term of this patent is extended or adjusted under 35 U.S.C. 154(b) by 427 days.

(21) Appl. No.: 14/481,874

(22) Filed: Sep. 9, 2014

Related U.S. Application Data

(60) Provisional application No. 61/875,596, filed on Sep. 9, 2013, provisional application No. 61/875,620, filed on Sep. 9, 2013, provisional application No. 61/894,892, filed on Oct. 23, 2013.

(51) Int. Cl.
*H04L 29/08* (2006.01)
*H04M 1/725* (2006.01)
*G06F 3/0482* (2013.01)
*G06F 3/0484* (2013.01)
*G06F 3/0488* (2013.01)

(52) U.S. Cl.
CPC .......... *H04L 67/025* (2013.01); *G06F 3/0482* (2013.01); *G06F 3/0488* (2013.01); *G06F 3/04842* (2013.01); *H04M 1/72583* (2013.01)

(58) Field of Classification Search
CPC ..... G06F 3/0482; G06F 3/0484; G06F 3/0488
See application file for complete search history.

(56) References Cited

U.S. PATENT DOCUMENTS

| 7,400,322 | B1 * | 7/2008 | Urbach | G09G 5/14 345/419 |
| 8,788,950 | B2 * | 7/2014 | Ivashin | G06F 3/038 715/753 |
| 9,015,235 | B2 * | 4/2015 | Saxena | H04L 67/10 709/203 |

(Continued)

*Primary Examiner* — David Choi
(74) *Attorney, Agent, or Firm* — Tillman Wright, PLLC; Chad D. Tillman; Jeremy C. Doerre

(57) ABSTRACT

Sharing resources by users of computing devices includes providing, at each computing device, a respective viewport to a common desktop environment that has the shared resources. The desktop is independently viewable and independently navigable through each respective viewport. Furthermore, each of the resources is independently viewable and able to be independently acted upon through each respective viewport. One or more resources of each computing device may be added to the desktop environment through the respective viewport of the computing device. A search user interface is provided for text string searching of resources of a respective viewport by a user at the computing device of the respective viewport; and an application launcher view user interface is provided for launching applications, which is viewable by clicking on an open space of the desktop environment as seen through the respective viewport, and by which launchable applications are searchable.

19 Claims, 27 Drawing Sheets

(56) References Cited

U.S. PATENT DOCUMENTS

| | | | | |
|---|---|---|---|---|
| 9,032,325 B2* | 5/2015 | Janssen | ............... | G06F 3/0481 715/769 |
| 2007/0097150 A1* | 5/2007 | Ivashin | ............... | G06F 3/0485 345/660 |
| 2009/0070687 A1* | 3/2009 | Mazzaferri | ............ | G06F 9/542 715/751 |
| 2009/0292999 A1* | 11/2009 | LaBine | ............... | G06F 3/1454 715/740 |
| 2012/0084713 A1* | 4/2012 | Desai | .................... | G06F 3/0481 715/788 |
| 2012/0226742 A1* | 9/2012 | Momchilov | ......... | G06F 3/1454 709/203 |
| 2012/0324365 A1* | 12/2012 | Momchilov | ............. | G06F 3/14 715/738 |
| 2013/0067020 A1* | 3/2013 | German | ................ | H04L 67/22 709/213 |
| 2013/0290857 A1* | 10/2013 | Beveridge | ............ | G06F 3/0484 715/740 |
| 2014/0013234 A1* | 1/2014 | Beveridge | ............ | G06F 3/0484 715/740 |
| 2014/0372506 A1* | 12/2014 | Butner | ................... | H04L 67/04 709/203 |

* cited by examiner

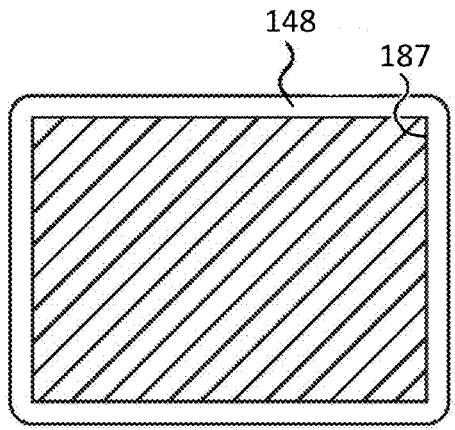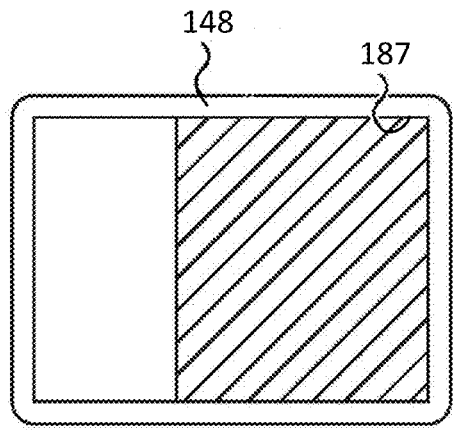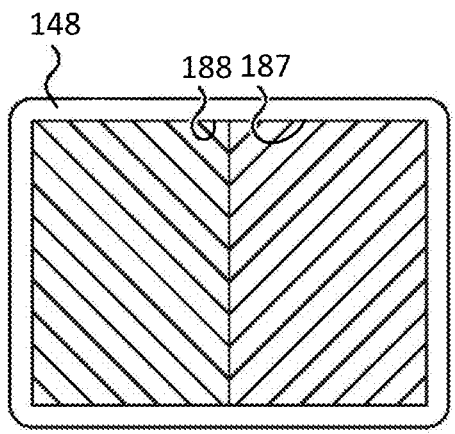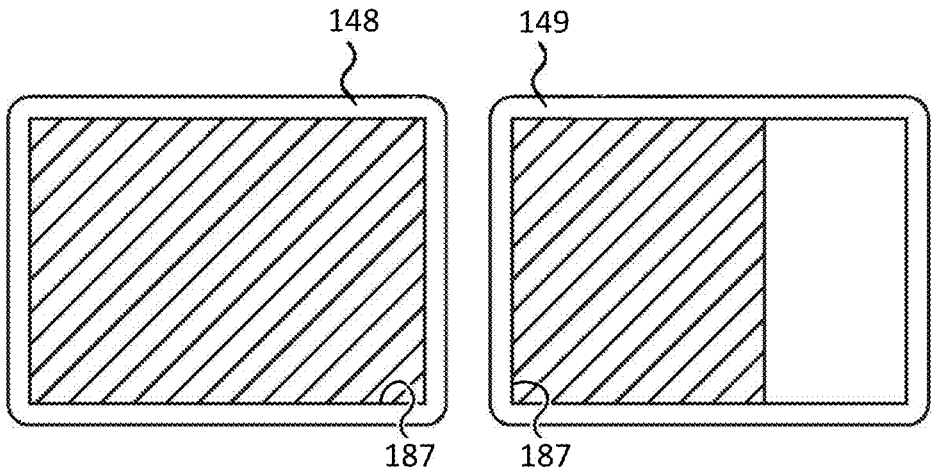

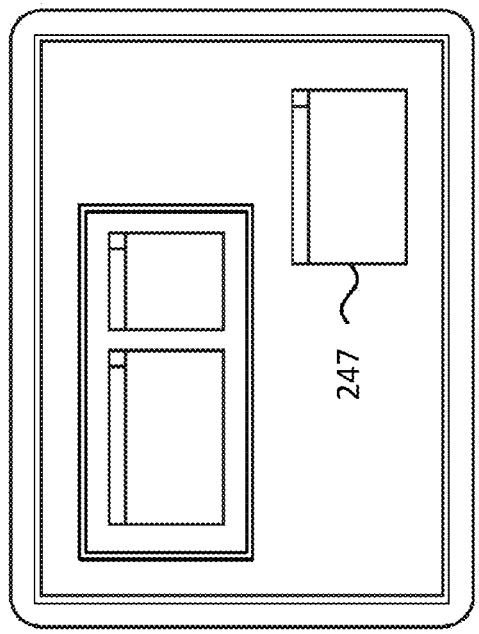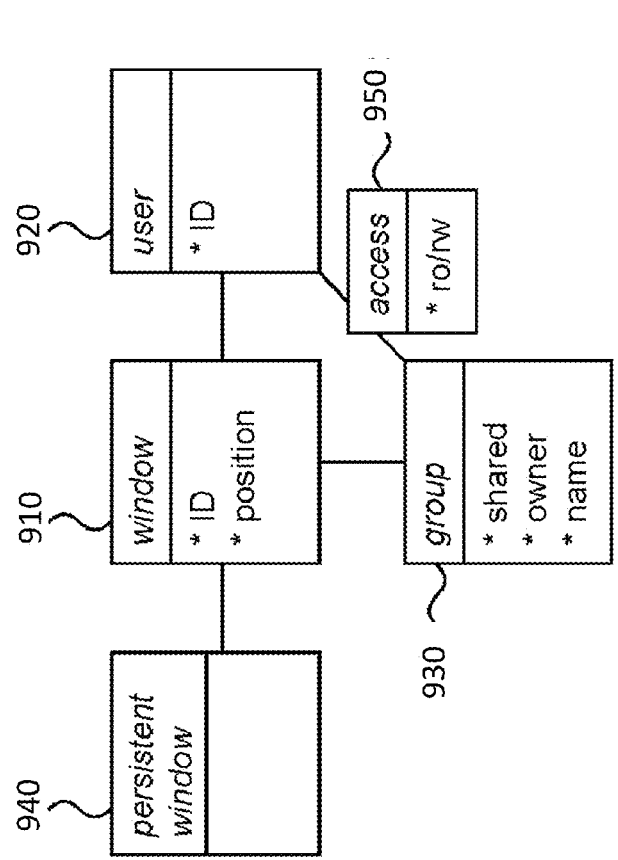
FIG. 25

USER INTERACTION WITH DESKTOP ENVIRONMENT

CROSS-REFERENCE TO RELATED APPLICATION

The present application is a nonprovisional patent application of, and claims priority under 35 U.S.C. §119 to, U.S. provisional patent applications 61/875,596; 61/875,620; and 61/894,892, each of which—including any source code and appendices thereof—is hereby incorporated by reference herein and forms part of the present application's disclosure. Disclosures from these applications can be found in the appendices attached hereto, incorporated by reference herein. Furthermore, Applicant's nonprovisional patent application Ser. No. 13/842,627 and 14/020,858—including any publications thereof and patents issuing therefrom—are incorporated by reference herein and form part of this application's disclosure.

COPYRIGHT STATEMENT

All of the material in this patent document, including source code, is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

COMPUTER PROGRAM LISTING

Submitted concurrently herewith via the USPTO's electronic filing system, and incorporated herein by reference, are computer program files including instructions, routines, and/or other contents of one or more computer programs. A table setting forth the name and size of files included in the computer program listing is included below.

| File Name | Creation Date | File Size (bytes) |
| --- | --- | --- |
| ascify.txt | Oct. 23, 2013 18:04 | 37473 |
| code1.txt | Oct. 23, 2013 18:08 | 22478505 |
| code2.txt | Oct. 23, 2013 18:08 | 22478162 |
| code3.txt | Oct. 23, 2013 18:08 | 22477819 |
| code4.txt | Oct. 23, 2013 18:08 | 17921211 |
| zoowm1.txt | Sep. 9, 2013 15:27 | 22478505 |
| zoowm2.txt | Sep. 9, 2013 15:27 | 22478162 |
| zoowm3.txt | Sep. 9, 2013 15:27 | 10835141 |
| readme.txt | Sep. 9, 2014 17:06 | 3071 |

One of these files, "readme.txt", contains instructions for extracting information from other of the files. The other files represent compressed binary files that have been converted to ascii format. These files can be converted back to compressed .zip archives utilizing an assembly conversion program source code for which is contained in "ascify.txt". The readme file includes instructions for compiling and running this conversion program, and instructions for converting the other text files to compressed, binary files.

Some of these compressed, binary files include source code written in C++ that can be compiled utilizing Microsoft Visual Studio. The target environment for implementations utilizing such source code is 32-bit or 64-bit Windows XP, Vista, 7, or 8.

In particular, the "readme.txt" file contains instructions for utilizing "ascify.txt" to convert "zoowm1.txt", "zoowm2.txt" and "zoowm3.txt" into a compressed .zip archive, and instructions for converting "code1.txt", "code2.txt", "code3.txt", and "code4.txt" into another compressed .zip archive.

BACKGROUND

Field

Aspects of the present invention generally relate to systems that enable sharing of information between computing devices, and preferably to cooperative sharing of resources of computing devices among different users in a desktop environment, the resources including applications, windows, files and information.

Description of Related Art

Desktop sharing systems do not support multiple parties operating together so that the different parties having access to a shared desktop would be able to bring their own windows to the shared desktop. Also, windows appearing on top of other windows on the shared desktop will inhibit different parties from working with different windows at the same time if some of the relevant windows are occluded by others. These problems with desktop sharing systems disable multiple user cases where a user, who is currently not sharing his own desktop, would need to share one of his windows to the other parties e.g. because it contains valuable information to the other parties or where the parties would need to be able to collaborate or cooperate using a number of windows or applications. It would be advantageous to have a system where multiple users could share and/or interact with one or more windows or comparable resources, substantially simultaneously in the same desktop.

In some desktop sharing systems it is also difficult or even not possible to control and verify which windows on the desktop a guest user is allowed to see. This can be a problem in situations where a user would like to allow or enable a guest user, for example a technical support person, to see some but not all of the windows that are open and/or to verify which windows the guest user will be able to see. It would be advantageous to have a system that makes it possible and efficient to control and visually verify which windows are shared with a guest user.

Certain desktop sharing and windowing applications will support multiple users simultaneously sharing windows, generally referred to as resources herein, that are presented on a desktop, with a fixed, limited size. However, in a workspace with a limited size it is difficult to establish a layout with which the multiple users are comfortable working, which can depend upon, for example, visibility, accessibility and relative positioning of the resources on the desktop such that the positioning supports workflow. In order for two or more users to be able to work on different resources on the shared desktop, the resources generally need to occupy different regions of the available desktop space. This generally means that the individual dimensions of the different resources will have to be reduced to less than half of the available screen space to remain fully visible. It would be advantageous if multiple users working on different resources at the same time could do so without needing to limit the size of the resources and if even large numbers of resources could be laid out so that the layout of resources is comfortable for multiple users to work with.

For instance, in the aforementioned desktop sharing systems, it can also be difficult to maintain a layout where resources such as windows do not overlap, or establish layouts with spatially stable relationships between them. While increasing the size or display resolution of the physical display, or adding multiple monitors, may aim to address this problem, larger or additional monitors are generally not able to compensate for the increasing number of (active) resources on the desktop. If more windows are continually opened, the amount of open windows will eventually crowd the available display space. As a result, these systems typically allow users to work with only one window at a time, since allowing users to work with more than one window would cause space contention when two or more users try to use different windows that overlap on the desktop. It would be advantageous for multiple users to have access to a shared environment that contains more than one, or a number of resources, without having to negotiate their use of screen real estate.

Because users are customarily positioned substantially in front of their display device, in terms of viewing direction, users will tend to position their active windows approximately in the middle of the screen of the display device (horizontally) so that they do not have to turn their head or body to look at the window(s) with which they are working. However, in the typical desktop sharing system, all users share the same view. This means that when two or more users are working on different resources on the shared desktop, it may not be possible or practical for every user to position the resource on which the user is working in the center region of the screen. It would be advantageous if all users could position the resource they are working on in the center region of their respective screens. The terms "screen", "display" or "display area" are generally intended to include the area of a display device that can be used to present resources, as is generally described herein.

In a multiple user environment, different users may be working on a shared set of resources, but they may not have a sense of a shared context of work or cooperation with other team members, which can make the coordination of activities difficult. For example, in systems where multiple users are working on a shared set of documents, but where the users work with the documents in the context of their own resources, the users will have minimal, if any, awareness of the working context of the other users. It would be advantageous for a user to be able to quickly see what shared resources other users are and have been using, as well as how those resources are and have been arranged, even when not actively being used by themselves.

Remote desktop systems are frequently used by a user to share a desktop between multiple devices. However, these systems suffer from the problem that because different devices are frequently used in different working contexts (e.g., work or home) where different windows will also frequently be used, and the stacking order of windows will frequently change whenever the user switches between different devices. This will generally make transitioning between working contexts more difficult, as the user will have to re-establish the working context whenever the user switches between devices and working contexts. It would be advantageous to use different devices to access different windows in a single desktop without affecting the layout of windows in the shared desktop.

Windows usually overlap in desktop sharing systems and the layout or stacking order of windows can change when a window is activated, which can include a window getting focus or moving to the foreground. Thus, when a window is activated, also referred to as an active window, the layout or order of the other windows on the display relative to the active window can change, potentially reducing visibility of window regions that were previously visible. Similarly, in desktop sharing systems, the creation of new windows can obstruct another user's view to other windows with which that user was working as the new windows that have been created appear on top of other windows. It would be advantageous to have a desktop space in which resources do not have to overlap in order to fit in the desktop space, regardless of their sizes, but in which the resources can be arranged in a spatially stable and non-overlapping manner instead. Such a desktop space would: be easier for its users to navigate because they will be able to employ their spatial memory more effectively to locate specific resources in the desktop space; allow its users to work with windows that cover much of the display area without losing context of work; and support more efficient cooperation between multiple users, as users' resources can be arranged so that they will not be occluded by other users' resources.

In many traditional systems such as the MICROSOFT WINDOWS 7™ operating system, windows can be minimized, which hides the window in the taskbar. In these systems, minimizing is a frequent operation performed to hide items not needed anymore or when a user thinks that a window is in the way. This can be problematic in a multi-user context where minimizing a window may have adverse effect on other users who may want to continue working with or otherwise viewing the window. It would be advantageous to have a system in which windows that a user is working on will not be frequently hidden by activities of another user.

Instant messaging systems, chat rooms and other communication systems such as the channels on Internet Relay Chat (IRC) or Skype™ are frequently used for cooperation and collaboration. One of the limitations of such systems is that the participating users will generally have their own, individual copies of the resources being worked on. As an example, it is common that participants post links or documents that each participant will have to open separately to access some resource that is to be shared between the participants. It is also possible that the links to documents will scroll in the window with more text entries being introduced in the window so that the user may have to scroll the chat window to locate the address or link that will open the shared resource. This is inconvenient for the sender, who might first have to make some resource (e.g., a snippet of programming code) available online and then separately post the URL to that resource to others in the chat room, and after which who may not be able to effectively monitor who actually looks at the resource. This can also be inconvenient for the respondents who have to download or open the document to see what the sender wants them to see. It would be advantageous for different parties to be able to share live resources in a shared space so anyone with access rights in the environment can access and interact effortlessly with such shared resources.

Certain social systems allow users to promote a resource by, for example, "liking" a resource. However, this requires explicit action on part of the user, and it may not be possible to actively monitor interest in an activity on a resource as the resource is accessed or acted upon, e.g., visits or the amount of time spent on the resource by users. For instance, it may be difficult for a FACEBOOK™ user to see what shared resources their friends, currently also logged in to FACEBOOK™, are viewing or acting upon. It would be advantageous for a user to be able to directly observe when a resource is accessed, visited, spent time on, or acted upon, and to provide an indication of the amount of interest in or activity on a resource, to users.

In a desktop type of sharing solution, the space is shared actively by the host. When the host quits, the session is terminated. It would be advantageous to be able to use a server to host a session that does not terminate or to have a distributed session that does not end until all the users have quit.

Accordingly, it would be desirable to provide a system that addresses at least some of the problems identified above.

SUMMARY OF THE INVENTION

The present invention includes many aspects and features. Moreover, while many aspects and features relate to, and are described in, the context of multiple users sharing resources or otherwise collaborating, the present invention is not limited to use only in such context, as will become apparent from the following summaries and detailed descriptions of aspects, features, and various embodiments of the present invention.

Furthermore, aspects of the present inventions generally relate to systems, methods, and apparatus of desktop environments having resources including, for example, applications, windows, files, information, web documents, or pages, and any combination thereof. Many aspects relate to desktop environments having such resources for view and access by a user using one or more computing devices; many aspects relate to desktop environments having resources for view and access by a plurality of users using a plurality of devices; and many aspects relate to navigation of such desktop environments.

Accordingly, one aspect of the present invention relates to a computer program product for providing a graphical user interface for displaying of and enabling cooperative use of resources on a display of a computing device.

In one embodiment of this aspect, the computer program product includes computer readable code in non-transitory computer-readable medium (memory) that, when executed by a processor device, are configured to provide a desktop environment, the desktop environment being configured to represent the resources on the display of the computing device; provide a first viewport to at least a portion of the desktop environment on the display of the computing device; enable a resource to be added to the desktop environment and be viewed within the first viewport; and enable the resource to be acted upon within the first viewport.

Another aspect of the present invention relates to a method for providing a graphical user interface for displaying and enabling cooperation with resources on a display of a computing device. In one embodiment, the method includes providing a desktop environment, the desktop environment being configured to represent the resources on the display of the computing device; providing a first viewport to at least a portion of the desktop environment on the display of the computing device; enabling a resource to be added to the desktop environment and be viewed within the first viewport; and enabling the resource to be acted upon within the first viewport.

A further aspect is directed to a display device for displaying and enabling cooperation with resources. In one embodiment, the display device includes a user interface; and a controller in communication with the user interface, the controller having a memory including programming instructions that, when executed by a processor, are configured to cause the controller to provide a desktop environment; provide one or more viewports to the desktop environment; enable one or more resources to be added to the desktop environment, the viewport providing a gateway to the resources that enables interaction with the resources through the user interface; and enable selection of a resource within a viewport to bring the selected resource to a forefront of the user interface.

A further aspect is directed to a display device for displaying and enabling cooperation with resources. In one embodiment, the display device includes a user interface; and a controller in communication with the user interface, the controller having a memory including programming instructions that, when executed by a processor, are configured to cause the controller to provide a desktop environment; provide one or more viewports to the desktop environment; enable one or more resources to be added to the desktop environment, the viewport providing a gateway to the resources that enables interaction with the resources through the user interface; and enable selection of a resource within a viewport to bring the selected resource to a forefront of the user interface.

In another aspect, a computer program product including non-transitory computer-readable medium contains computer-executable instructions for providing a graphical user interface enabling the cooperative use by multiple users of resources on a display of a computing device. The computer-executable instructions, when executed on a computing device having a processor, perform a method including the steps of: providing a desktop environment; providing a first viewport configured to show at least a portion of the desktop environment on the display of the computing device; enabling a resource to be added to the desktop environment and to be viewed within the first viewport; and enabling the resource to be acted upon within the first viewport.

In a feature of this aspect, the method further includes the steps of providing a second viewport to the desktop environment; enabling the resource to be viewed from within the second viewport; and enabling the resource to be acted upon within the second viewport.

With further respect to this feature, the second viewport is preferably provided on a display of a different computing device.

With further respect to this feature, the method preferably includes the steps of enabling another resource to be added to the desktop environment through one of the first viewport and the second viewport; and enabling said another added resource to be viewed and acted upon through both the first viewport and the second viewport. The method may further include the steps of enabling a layout of resources to be represented differently in different viewports.

In another feature of this aspect, the method further includes the steps of enabling a first resource to be added to the desktop environment through first viewport from the computing device; and enabling a second resource to be added to the desktop environment through a first viewport on another computing device.

In a feature, the method further includes the steps of providing a second viewport to the portion of the desktop environment on another computing device; enabling the resource to be viewed within both of the first viewport and the second viewport; and enabling the resource to be acted on within both of the first viewport and the second viewport.

In a feature, the method further includes the steps of enabling a representation of the resource to appear in a different scale within the first viewport based on a region of the desktop environment encompassed by the first viewport.

In a feature, the method further includes the steps of arranging resources in the portion of the desktop environment within the first viewport so that the resources do not substantially overlap along an X-Y plane.

In a feature, the method further includes the steps of providing resources on the display of the computing device outside of the first viewport; and enabling manipulation of the resources outside of the first viewport independently from the resource within the first viewport.

In a feature, the method further includes the steps of providing an indication within the first viewport of a presence of a user with respect to the desktop environment and a distance from another user.

In a feature, the method further includes the steps of enabling the first viewport to be moved from a first position on the display of the computing device to a second position on the display.

In a feature, the method further includes the steps of resizing the first viewport.

In a feature, the resource includes a set of one or more application windows. The set of one or more application windows may be configured to be maintained in a non-minimized state.

In a feature, the method further includes the steps of determining an amount of interest towards resources in a group of resources and arranging the resources in the group of resources so that a layout of the resources reflects the amount of interest towards the resources.

In another aspect, a method for facilitating cooperation by users in working with resources on a display of a computing device includes the steps of: providing desktop environment, the environment being configured to represent the resources on the display of the computing device; providing a first viewport configured to show to at least a portion of the desktop environment on the display of the computing device; enabling a resource to be added to the desktop environment and to be viewed within the first viewport; and enabling the resource to be acted upon within the first viewport.

In a feature, the method includes the steps of: providing a second viewport to the desktop environment; enabling the resource to be viewed from within the second viewport; and enabling the resource to be acted upon within the second viewport. The second viewport may be provided on a display of a different computing device.

In a feature, the method further includes the steps of enabling another resource to be added to the desktop environment through the first viewport or the second viewport; and enabling the another added resource to be viewed and acted upon through both the first viewport and the second viewport. The method may further include enabling layouts of resources to be represented differently in different viewports; and/or enabling a first resource and a second resource in the second viewport to be acted upon independently through the first viewport and the second viewport.

In a feature, the method further includes the steps of: enabling a first resource to be added to the desktop environment through first viewport from the computing device; and enabling a second resource to be added to the desktop environment through a first viewport on another computing device.

In a feature, the method further includes the steps of: providing a second viewport to the portion of the desktop environment on another computing device; enabling the resource to be viewed within both of the first viewport and the second viewport; and enabling the resource to be acted on within both of the first viewport and the second viewport.

In a feature, the method further includes the step of enabling a representation of the resource to appear in a different scale within the first viewport based on a position of the first viewport relative to the desktop environment.

In a feature, the method further includes the steps of arranging resources in the portion of the desktop environment within the first viewport so that the resources do not substantially overlap along an X-Y plane.

In a feature, the method further includes the steps of: providing resources on the display of the computing device outside of the first viewport; and enabling manipulation of the resources outside of the first viewport independently from the resource within the first viewport.

In a feature, the method further includes the steps of: enabling resources within the first viewport to be shared between at least a first user and a second user; and enabling the first user to navigate between resources within the desktop environment independently of the second user.

In a feature, the method further includes the steps of: providing an indication within the first viewport of a presence of a user with respect to the desktop environment and a distance from another user.

In a feature, the method further includes the steps of: enabling the first viewport to be moved from a first position on the display of the computing device to a second position on the display.

In a feature, the resource includes a set of application windows. The set of application windows are configured to be maintained in a non-minimized state.

In a feature, the method further includes the steps of: determining which resources are frequently accessed resources and which are less frequently accessed resources; and positioning the frequently accessed resources toward a central position relative to other resources, while positioning the less frequently accessed resources away from the central position.

In a feature, the method further includes the steps of automatically repositioning or resizing resources within the first viewport as new resources are added to enable the resources in the first viewport to remain fully visible in the first viewport.

In another aspect of the invention, a display device for displaying and enabling cooperation with resources includes: a user interface; and a controller in communication with the user interface, the controller having a memory including programming instructions. When executed by a processor, the programming instructions are configured to cause the controller to: provide a desktop environment; provide one or more viewports to the desktop environment; enable one or more resources to be added to the desktop environment, the viewport providing a gateway to the resources that enables interaction with the resources through the user interface; and enable selection of a resource within a viewport to bring the selected resource to a forefront of the user interface.

Another aspect of the present inventions comprises computer-executable instructions contained in non-transitory computer-readable medium that, when executed by a processor, provide a desktop environment configured to contain resources for view and access by a user using a computing device, in accordance with an innovation disclosed herein.

Another aspect comprises a method of providing a desktop environment configured to contain resources for view and access by a user using a computing device, in accordance with an innovation disclosed herein.

Another aspect comprises computer-executable instructions contained in non-transitory computer-readable medium that, when executed a processor, provide a desktop environment configured to contain resources for concurrent view and access by a plurality of users, at least two of the users each using a different computing device, in accordance with an innovation disclosed herein.

Another aspect comprises a method of providing a desktop environment configured to contain resources for concurrent view and access by a plurality of users, at least two of the users each using a different computing device, in accordance with an innovation disclosed herein.

Another aspect comprises computer-executable instructions contained in non-transitory computer-readable medium that, when executed a processor, provide a plurality of desktop environments each having resources for view and access by a user using a computing device, in accordance with an innovation disclosed herein.

Another aspect comprises a method of providing a plurality of desktop environments each having resources for view and access by a user using a computing device, in accordance with an innovation disclosed herein.

Another aspect comprises computer-executable instructions contained in non-transitory computer-readable medium that, when executed a processor, provide a plurality of desktop environments each desktop environment configured to contain resources for concurrent view and access by a plurality of users, at least two of the users each using a different computing device, in accordance with an innovation disclosed herein.

Another aspect comprises a method of providing a plurality of desktop environments each desktop environment configured to contain resources for concurrent view and access by a plurality of users, at least two of the users each using a different computing device, in accordance with an innovation disclosed herein.

Another aspect comprises computer-executable instructions contained in non-transitory computer-readable medium that, when executed a processor, provide a desktop environment configured to contain resources for view and access by a user using a computing device, wherein navigation of the desktop environment is in accordance with an innovation disclosed herein.

Another aspect comprises a method of providing a desktop environment configured to contain resources for view and access by a user using a computing device, wherein navigation of the desktop environment is in accordance with an innovation disclosed herein.

Another aspect comprises computer-executable instructions contained in non-transitory computer-readable medium that, when executed a processor, provide a desktop environment configured to contain resources for concurrent view and access by a plurality of users, at least two of the users each using a different computing device, wherein navigation of the desktop environment is in accordance with an innovation disclosed herein.

Another aspect comprises a method of providing a desktop environment configured to contain resources for concurrent view and access by a plurality of users, at least two of the users each using a different computing device, wherein navigation of the desktop environment is in accordance with an innovation disclosed herein.

Another aspect comprises computer-executable instructions contained in non-transitory computer-readable medium that, when executed a processor, provide a plurality of desktop environments each having resources for view and access by a user using a computing device, wherein navigation of at least one of the desktop environments is in accordance with an innovation disclosed herein.

Another aspect comprises a method of providing a plurality of desktop environments each having resources for view and access by a user using a computing device, wherein navigation at least one of the desktop environments in accordance with an innovation disclosed herein.

Another aspect comprises computer-executable instructions contained in non-transitory computer-readable medium that, when executed a processor, provide a plurality of desktop environments each desktop environment configured to contain resources for concurrent view and access by a plurality of users, at least two of the users each using a different computing device, wherein navigation of at least one of the desktop environments is in accordance with an innovation disclosed herein.

Another aspect comprises a method of providing a plurality of desktop environments each desktop environment configured to contain resources for concurrent view and access by a plurality of users, at least two of the users each using a different computing device, wherein navigation of at least one of the desktop environments is in accordance with an innovation disclosed herein.

Another aspect comprises computer-executable instructions contained in non-transitory computer-readable medium that, when executed a processor, provide a desktop environment configured to contain resources for view and access by a user using a computing device, wherein user interaction with the desktop environment is provided in accordance with an innovation disclosed herein.

Another aspect comprises a method of providing a desktop environment configured to contain resources for view and access by a user using a computing device, wherein user interaction with the desktop environment is provided in accordance with an innovation disclosed herein.

Another aspect comprises computer-executable instructions contained in non-transitory computer-readable medium that, when executed a processor, provide a desktop environment configured to contain resources for concurrent view and access by a plurality of users, at least two of the users each using a different computing device, wherein user interaction with the desktop environment is provided in accordance with an innovation disclosed herein.

Another aspect comprises a method of providing a desktop environment configured to contain resources for concurrent view and access by a plurality of users, at least two of the users each using a different computing device, wherein user interaction with the desktop environment is provided in accordance with an innovation disclosed herein.

Another aspect comprises computer-executable instructions contained in non-transitory computer-readable medium that, when executed a processor, provide a plurality of desktop environments each having resources for view and access by a user using a computing device, wherein user interaction with at least one of the desktop environments is provided in accordance with an innovation disclosed herein.

Another aspect comprises a method of providing a plurality of desktop environments each having resources for view and access by a user using a computing device, wherein user interaction with at least one of the desktop environments is provided in accordance with an innovation disclosed herein.

Another aspect comprises computer-executable instructions contained in non-transitory computer-readable medium that, when executed a processor, provide a plurality of desktop environments each desktop environment configured to contain resources for concurrent view and access by a plurality of users, at least two of the users each using a different computing device, wherein user interaction with at least one of the desktop environments is provided in accordance with an innovation disclosed herein.

Another aspect comprises a method of providing a plurality of desktop environments each desktop environment configured to contain resources for concurrent view and access by a plurality of users, at least two of the users each using a different computing device, wherein user interaction with at least one of the desktop environments is provided in accordance with an innovation disclosed herein.

Another aspect comprises a graphical user interface for displaying of and enabling use of resources in a desktop environment in which the resources are presented for view and interaction by a user, wherein navigation of the desktop environment is provided in accordance with an innovation disclosed herein.

Another aspect comprises a graphical user interface for displaying of and enabling use of resources in a desktop environment in which the resources are presented for view and interaction by a user, wherein user interaction with the desktop environment is provided in accordance with an innovation disclosed herein.

In a feature of the foregoing aspects, resources comprise applications, windows, files, information, web documents, or web pages, and any combination thereof.

In a feature of the foregoing aspects, user interaction with the desktop environment comprises viewing a resource.

In a feature of the foregoing aspects, user interaction with the desktop environment comprises accessing a resource.

In a feature of the foregoing aspects, user interaction with the desktop environment comprises viewing a resource in a sub-environment.

In a feature of the foregoing aspects, the user interaction with the desktop environment comprises accessing a resource in a sub-environment.

In a feature of the foregoing aspects, the user interaction with the desktop environment comprises navigating within a desktop environment.

Another aspect comprises a system comprising any of the foregoing aspects.

Other aspects of the present inventions comprise one or more computing devices comprising any of the foregoing aspects.

The aforementioned innovations can be found in the disclosures in the source code submitted herewith and incorporated herein by reference; and in the source code and appendices of the above priority U.S. provisional patent applications, which source code and appendices also are incorporated herein by reference, including the innovations found in the disclosures thereof in Appendix A, which contains a draft paper titled "Shared Virtual Desktops"; in Appendix B; in Appendix C, which contains a disclosure document titled "DIRECTION-BASED WINDOW SWITCHING"; in Appendix D, which contains a disclosure document titled "GAZE MODULATED NAVIGATION ON A VIRTUAL DESKTOP"; in Appendix E, which contains a disclosure document titled "FLOW ZOOM"; in Appendix F, which contains a disclosure document titled "GLIMPSE"; in Appendix G, which contains a disclosure document titled "INDICATORS OF RESOURCES OUTSIDE THE VIEW"; in Appendix H, which contains a disclosure document titled "VIRTUAL DESKTOP ALT+TAB"; in Appendix I, which contains a disclosure document titled "(CONTEXT DEPENDENT) PERIPHERAL MONITORING ON A VIRTUAL DESKTOP"; in Appendix J, which contains a disclosure document titled "DESKTOP CONDENSATION"; in Appendix K, which contains a disclosure document titled "GROUP COLLAPSE/SPREAD"; in Appendix L, which contains a disclosure document titled "WINDOW REPOSITIONING"; in Appendix M, which contains a disclosure document titled "WINDOW SWAP"; in Appendix N, which contains a disclosure document titled "CURSOR REPOSITIONING TO SCREEN CENTER WHEN LEFT OFF SCREEN"; in Appendix O, which contains a disclosure document titled "HOVER PEEK FEATURE"; in Appendix P, which contains a disclosure document titled "APP LAUNCHER"; in Appendix Q, which contains a disclosure document titled "SHAKE/TWITCH ZOOM"; in Appendix R, which contains a disclosure document titled "VIRTUAL DESKTOP TEXT SEARCH"; in Appendix S, which contains a disclosure document titled "NAVIGATING ON A VIRTUAL DESKTOP USING MOTIONS OF A DEVICE"; in Appendix T, which contains a disclosure document titled "ALARMS ON A VIRTUAL DESKTOP"; in Appendix U, which contains a disclosure document titled "VISUALIZATIONS OF USER ACTIVITY"; in Appendix V, which contains a disclosure document titled "NAVIGATION HISTORY VISUALIZATION"; in Appendix W, which contains a disclosure document titled "VISUAL CONNECTIONS BETWEEN RESOURCES"; in Appendix X, which contains a disclosure document titled "RADAR VISUALIZATIONS OF OTHER USERS POSITIONS"; and in Appendix Y, which contains a disclosure document titled "SMART ZOOM". The source code and the foregoing Appendices are incorporated herein by reference. Moreover, Appendices A and C through Y are found in the attached appendix of the present application, which is incorporated by reference herein.

Still yet further aspects of the present inventions comprise the combinations of one or more of the foregoing aspects and features with the innovations found in the disclosures of U.S. patent application Ser. Nos. 13/842,627 and 14/020,858, each of which—and any publications thereof and any patents issuing therefrom—are incorporated by reference herein; and further aspects of the present inventions comprise the combinations of one or more of the foregoing aspects and features with the innovations found in the disclosure of Appendix B of the priority provisional applications, incorporated herein.

These and other aspects and advantages will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects of the invention will be set forth in the description that follows, and additional advantages in part will be obvious from the description, or may be learned by practice of the invention. Moreover, aspects and advantages of the invention may be realized and obtained by means of the instrumentalities particularly pointed out in the appended claims and combinations thereof.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

FIG. 6 illustrates an example of a display configuration of a viewport in accordance with one or more aspects of the present invention.

FIG. 7 illustrates an example of another display configuration of a viewport in accordance with one or more aspects of the present invention.

FIG. 8 illustrates an example of a display configuration of a viewport in accordance with one or more aspects of the present invention.

FIG. 9 illustrates an example of a display configuration of a viewport in accordance with one or more aspects of the present invention.

FIG. 25 illustrates a schematic block diagram of one embodiment of a computing architecture for implementing aspects of the present invention.

DETAILED DESCRIPTION

Aspects of the present invention are generally directed to a multi-user computing environment, where there is a cooperative or collaborative sharing of resources, files and information between and among multiple users. Users are provided with one or more viewports through which they can observe resources in a desktop environment, zoom into and out from specific resources, as well as interact with those resources.

The term "resource" as is used herein, generally refers to any object or item, groups of objects or items, or any combination thereof, which can be placed and arranged on or in a desktop environment. Examples of "resources" can include, but are not limited to, application windows, or any visual output or indication of an application that provides the user with some type of user interface (which may or may not be interactive) to that or another application. Resources can also include, for example, web documents and resources. Such resources may include files and information. "Environment" is intended to include a large, theoretically infinite, space according to the desktop metaphor, in which "resources" can be arranged. In one embodiment, the extent or size of the environment is defined substantially by the size of an area within which the resources in that environment reside. One example of an "environment" is the desktop space of a computer, generally referred to herein as the desktop environment.

In accordance with the aspects of the disclosed embodiments, the resources can be accessed using different computing devices. The aspects of the disclosed embodiments advantageously support effective cooperation around or involving use of resources between users. The terms "cooperation", "cooperative" and "collaboration" as used herein, are generally intended to include any form of related activity by multiple parties, e.g., for personal or group benefit, in any context, e.g., private or work.

Desktop Environment, Resources, and Viewport

Multi-User Scenarios Including Server-Client & Peer-to-Peer

Figure 1A:
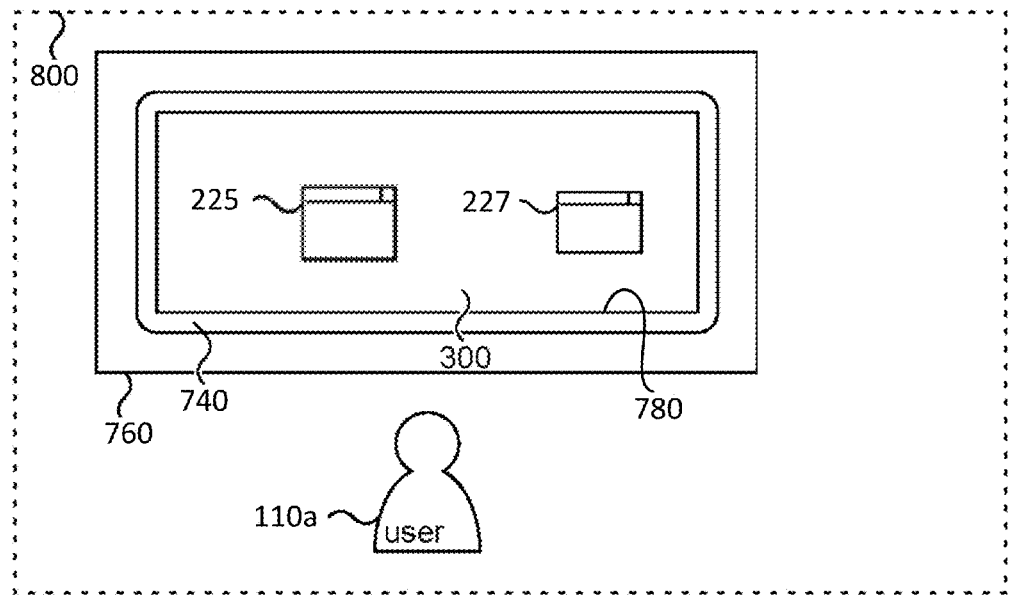
FIG. 1A illustrates a schematic block diagram of one embodiment of a system incorporating aspects of the present invention.
Figure 1B:
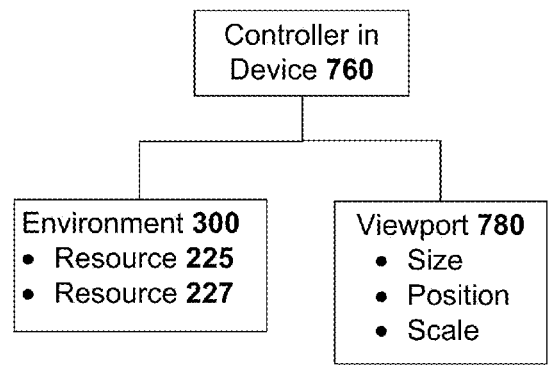
FIG. 1B illustrates a schematic block diagram of additional aspects of the system of FIG. 1A.

An embodiment of a system 800 in accordance with one or more aspects of the invention now is described first with reference to FIGS. 1A and 1B. The system 800 includes a computing system or device 760 having a display screen or display 170. In the example of FIG. 1A, the display screen 740 is a component of the computing device 760 and may be part of a graphical user interface of the computing device or, alternatively, may be a separate component from, and communicatively coupled to, the computing device. Examples of such computing devices or systems include, but are not limited to, a computer, personal computer, mobile communication device, tablet, and touch screen device.

As shown in FIG. 1A and represented in FIG. 1B, the computing device 760 further includes a controller having a memory including computer-executable instructions, which when executed by a processor of the device, provides a desktop environment 300 with resources 225,227 and a viewport 780 associated with the environment 300 that provides a gateway to the resources 225,227 enabling view and interaction with the resources 225,227 by the user 110a.

As further shown in FIG. 1A and represented in FIG. 1B, the viewport 780 has a size that is commensurate with the area of the display 740. The viewport 780 also has a position and a scale, relative to the desktop environment 300, which are adjustable such that all or only a portion of the desktop environment 300, as desired, is viewable through the viewport 780 by the user 110a on the display 740. Such adjustment may appear to the user 110a through the viewport 780 to be navigation of the desktop environment 300, and such navigation is discussed in greater detail below.

The controller further may provide additional viewports to the desktop environment, as described below, and the controller preferably enables additional resources to be added to the desktop environment, as described below. Moreover, while only a single desktop environment 300 is shown in FIG. 1A, in alternative embodiments, a plurality of environments are provided by the controller that may be shown simultaneously on the display 740 of the computing device 760.

With continuing reference to FIG. 1A, the user 110a is able to view each resource 225,227 through the viewport 780 and is able to interact with each resource 225,227 through the viewport 780. In this example, the two resources 225,227 represent application windows containing information presented by applications running on the computing device 760, although in alternative embodiments, a resource can comprise any resource as is otherwise described herein and need not necessarily represent an application window.

Figure 1C:
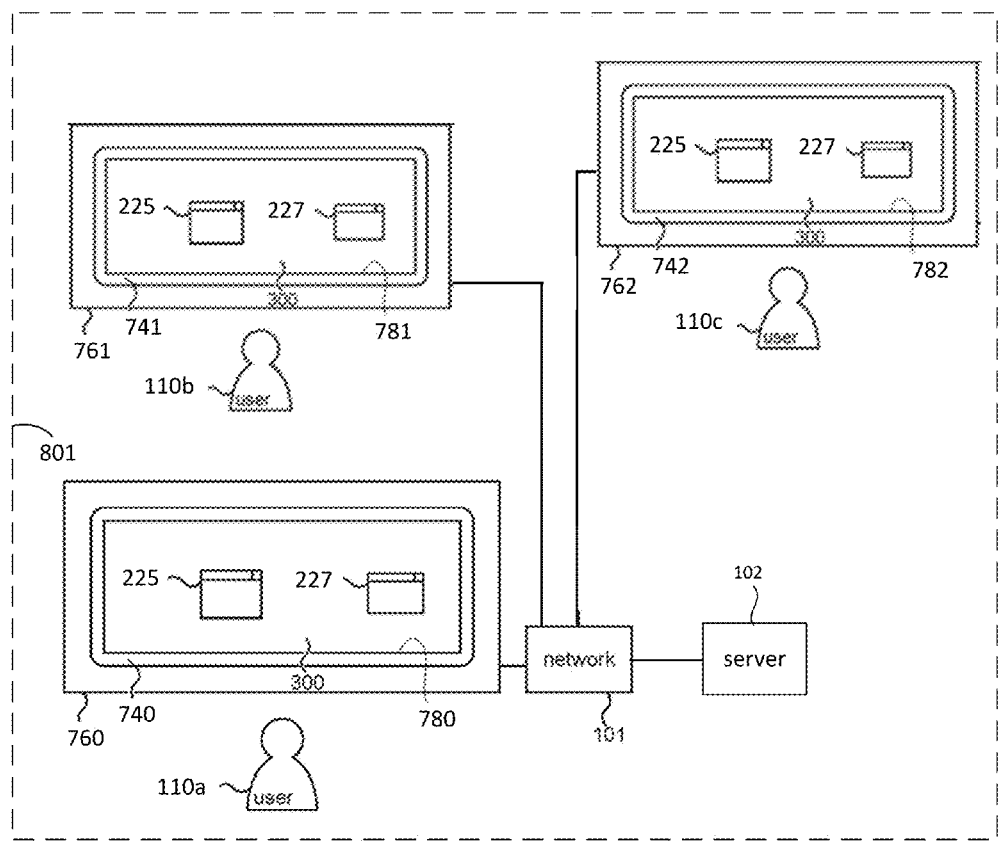
FIG. 1C illustrates a schematic block diagram of another embodiment of a system incorporating aspects of the present invention.
Figure 1D:
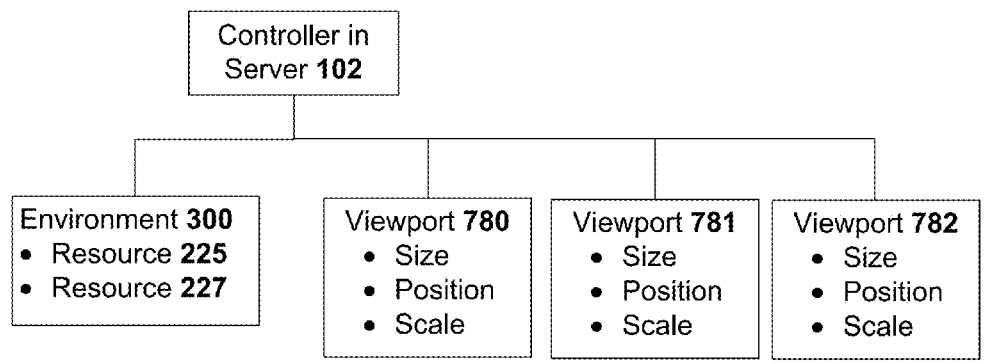
FIG. 1D illustrates a schematic block diagram of additional aspects of the system of FIG. 1C.
Figure 1E:
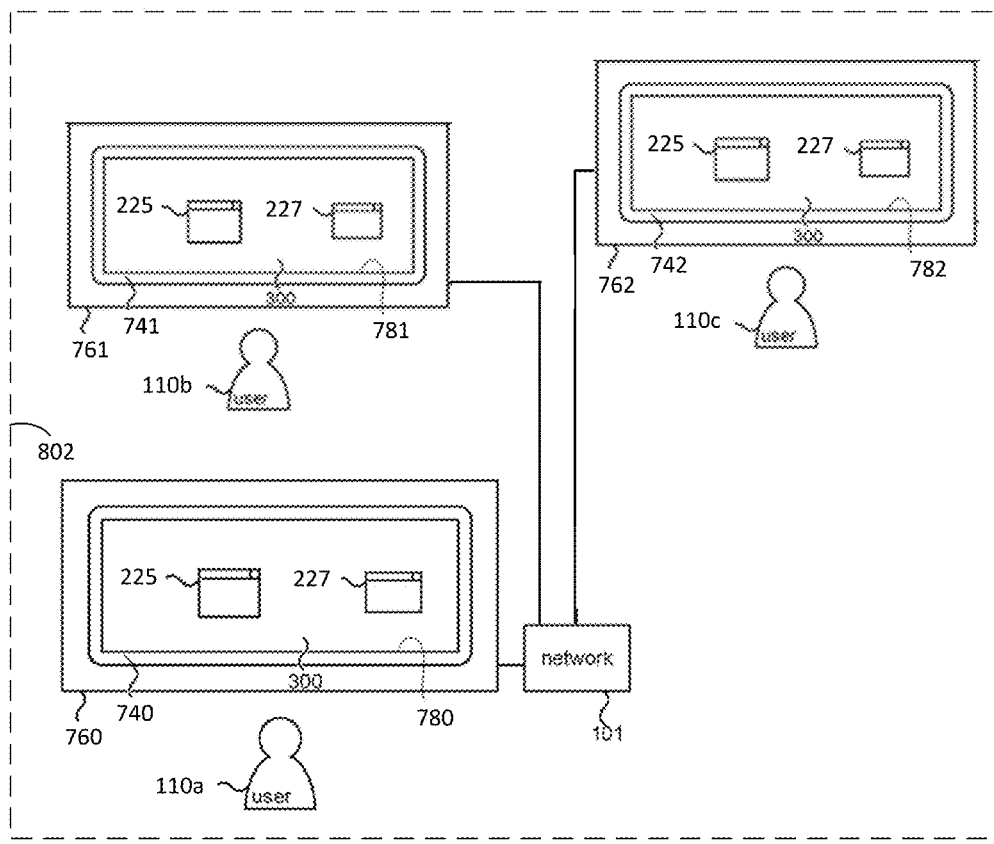
FIG. 1E illustrates a schematic block diagram of another embodiment of a system incorporating aspects of the present invention.
Figure 1F:
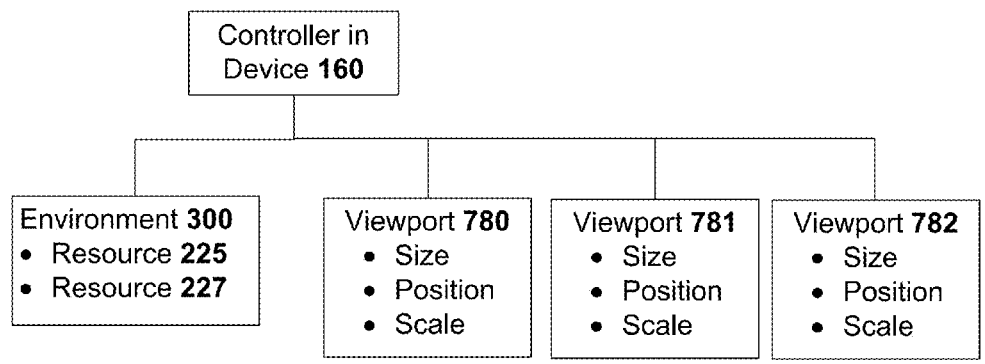
FIG. 1F illustrates a schematic block diagram of additional aspects of the system of FIG. 1E.

An alternative system 801 is shown in FIG. 1C and represented in FIG. 1D. System 801 is similar to system 800, and varies principally in that three users 110a,110b,110c are shown, with each user having a respective computing device 760,761,762 with respective display 740,741,742. Furthermore, each device is connected to a network 101, such as the Internet, for communications with a server 102. In this system 801, the controller provides the environment 300 with resources 225,227 to each of the devices 760,761,762 via respective viewports 780,781,782, whereby the server 102 enables communication and cooperation between all of the users within the desktop environment 300. The computer executable instructions providing the desktop environment and the viewports via the controller are contained in non-transitory computer-readable medium of the server 102 rather than in non-transitory computer-readable medium of the computing device 760 as in system 800. In an alternative to system 801 is shown in the system 802 of FIG. 1E and represented in FIG. 1F, the server 102 is omitted and the computing devices of the users 110a,110b,110c communicate directly with each other over the Internet 101.

In either such multi-user scenario, wherein each user has a respective viewport for viewing a common desktop environment and acting upon a shared resource seen therein, it should be understood that the same resource in the desktop environment may appear differently as seen by different users through different viewports. For example, within the viewport of one user a web resource such as a web page may appear in a Firefox™ browser window, and within the viewport of another user the same web resource may appear inside an Opera™ browser window. As another example, an application window to a text document could appear differently through viewports of different users so that the different users are able to see and interact with different parts of the text document.

As will be appreciated from the foregoing description systems 801,802, a multi-user computing environment is provided in accordance with aspects of the invention in which there is a cooperative or collaborative sharing of resources between and among multiple users, with users having one or more viewports through which they can observe resources in a common desktop environment, zoom into and out from specific resources, and interact with those resources.

Sub-Environments

Figure 1G:
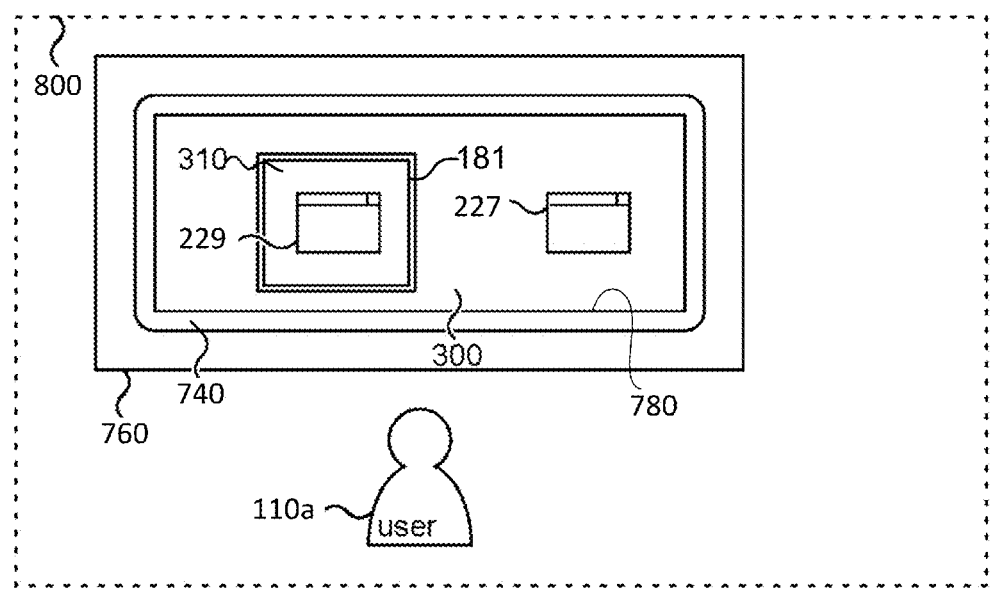
FIG. 1G illustrates the system of FIG. 1A in which a sub-environment is shown.

With continuing reference to system 800, in addition to including resources it is contemplated that the desktop environment 300 can include another desktop environment 300 referred to as a "sub-environment." FIG. 1G illustrates the sub-environment 310 as seen through viewport 181 in the environment 300. The sub-environment 310 includes desktop environment 310 having resource 229 visible through viewport 181.

Resources; Resource Groups

Figure 2:
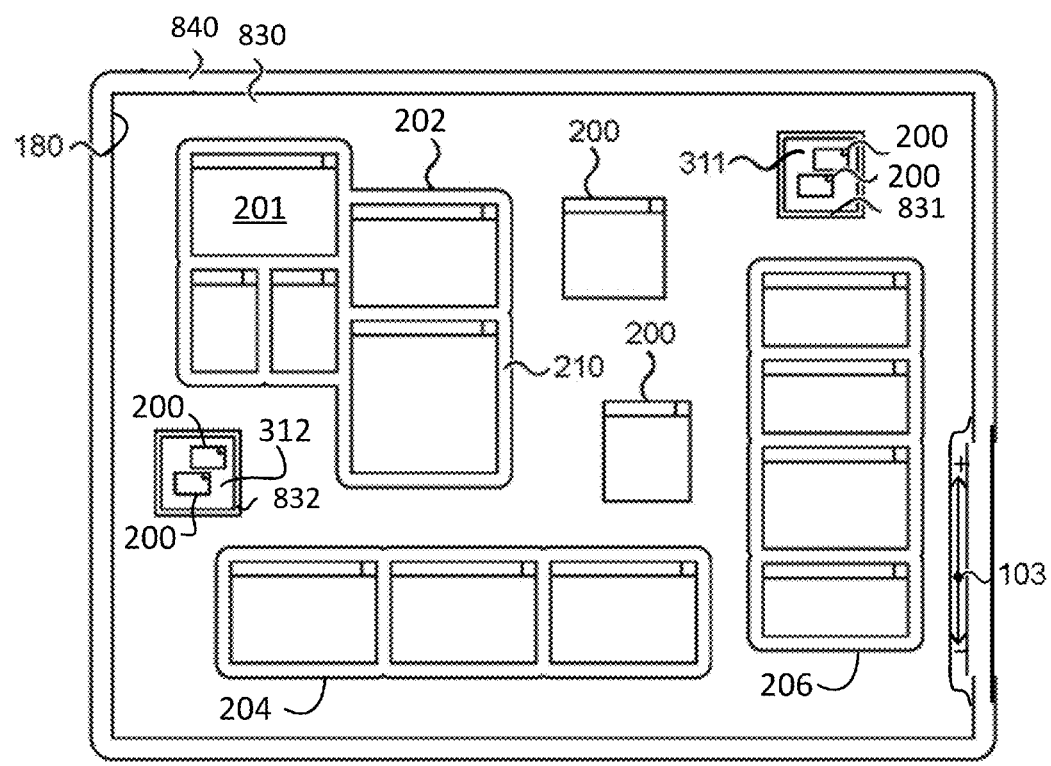
FIG. 2 illustrates one embodiment of an exemplary arrangement of sub-environments and resources within a desktop environment, in accordance with aspects of the present invention.

FIG. 2 illustrates an embodiment of an exemplary arrangement of desktop sub-environments within a desktop environment, in accordance with one or more aspects of the present invention. In this respect, a display 840 includes a viewport 180 in which is seen resources including: a plurality of resource groups 202,204,206, each resource group comprising a plurality of resources illustrated in a joined manner; and a plurality of resources 200 that are not part of a resource group, Two sub-environments are also seen through viewport 180, including desktop environment 311 through viewport 831 and desktop environment 312 through viewport 832. Moreover, two resources 200 are seen within desktop environment 311, and two resources 200 are seen within desktop environment 312.

Viewport Navigation

Figure 3:
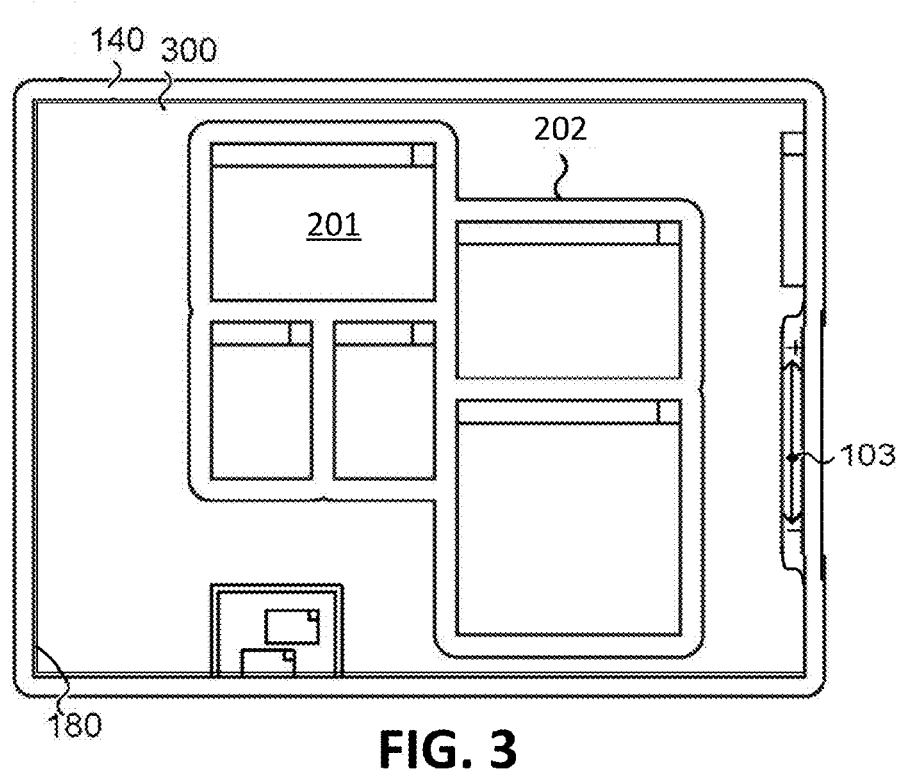
FIG. 3 illustrates a zoomed-in view of a portion of the arrangement illustrated in FIG. 2.
Figure 4:
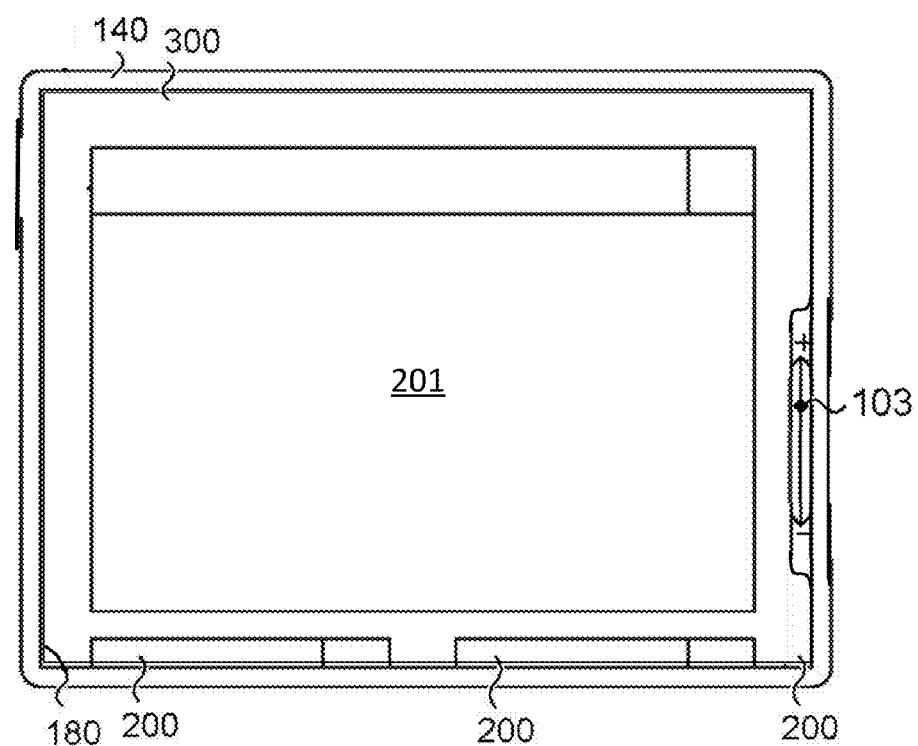
FIG. 4 illustrates a zoomed-in view of the portion of the arrangement illustrated in FIG. 3.

In navigating a desktop environment by way of a viewport, such as that shown in FIG. 2 for example, the viewport can be configured to show more or less of the desktop environment such that only a subset of resources, resource groups, and sub-environments are shown. Navigation of the desktop environment can be by panning (repositioning the viewport relative to the desktop environment); zooming (scaling the view of the desktop as through the viewport); adjusting the size of the viewport; or otherwise adjusting the region of the desktop environment 300 as seen through the viewport, including any combination of the foregoing. Furthermore, a viewport can be used to zoom into and out from specific resources in a sub-environment for interaction with the resources within the sub-environment. In performing navigation, the user preferably can zoom in directly on a specific resource, resource group, or sub-environment in the desktop environment by "clicking" on or otherwise selecting the specific resource, resource group, or sub-environment when not shown in full scale. For example, referring to FIG. 2, clicking on resource group 202 seen through the viewport 180 results in the zoomed-in view of resource group 202 seen through the viewport 180, as shown in FIG. 3. The act of clicking on resource group 202 includes either clicking on the outline or border of the resource group 202, or clicking on any of the resources shown to be part of the resource group 202. Thereafter, clicking on a resource of the resource group 202 causes the viewport 180 to further zoom-in on the selected resource. For example, clicking on resource 201 of resource group 202 as shown in FIG. 3 cause the viewport 180 to zoom-in on the selected resource 201, as shown in FIG. 4. This provides more focus on resource 201, in that a larger area of the resource 201 is shown as compared to the areas of the other resources, resource groups, and sub-environments. Similarly, the viewport can be utilized to zoom-out of the environment, meaning that more resources will be brought into the focus or field of view of the viewport.

Adjusting Scale or Magnification of Area Seen Through Viewport

In an embodiment, a scale or zoom adjustment device may be provided to allow scaling the zoom view or magnification feature of a viewport. For example, a zoom adjustment device 103 is provided inside the viewport 180 of FIG. 2, which is specific to the viewport 180. Operation of the zoom adjustment device is shown for example in FIGS. 3 and 4. Alternatively, the adjustment device can be external to the viewport. Furthermore, exemplary forms of such zoom adjustment devices can include for example, but are not limited to, plus and minus size indicators, an up/down scale or size adjustor, or zoom-in, zoom-out buttons, for example. Various interactions and user input elements can be used to manipulate the zoom or scale, including for example, touch and user gestures or input devices and methods such as a mouse, keyboard, pen and stylus.

Graphically Indicating Viewport Focus of Others

In Shared, Multi-User Desktop Environment

Figure 5:
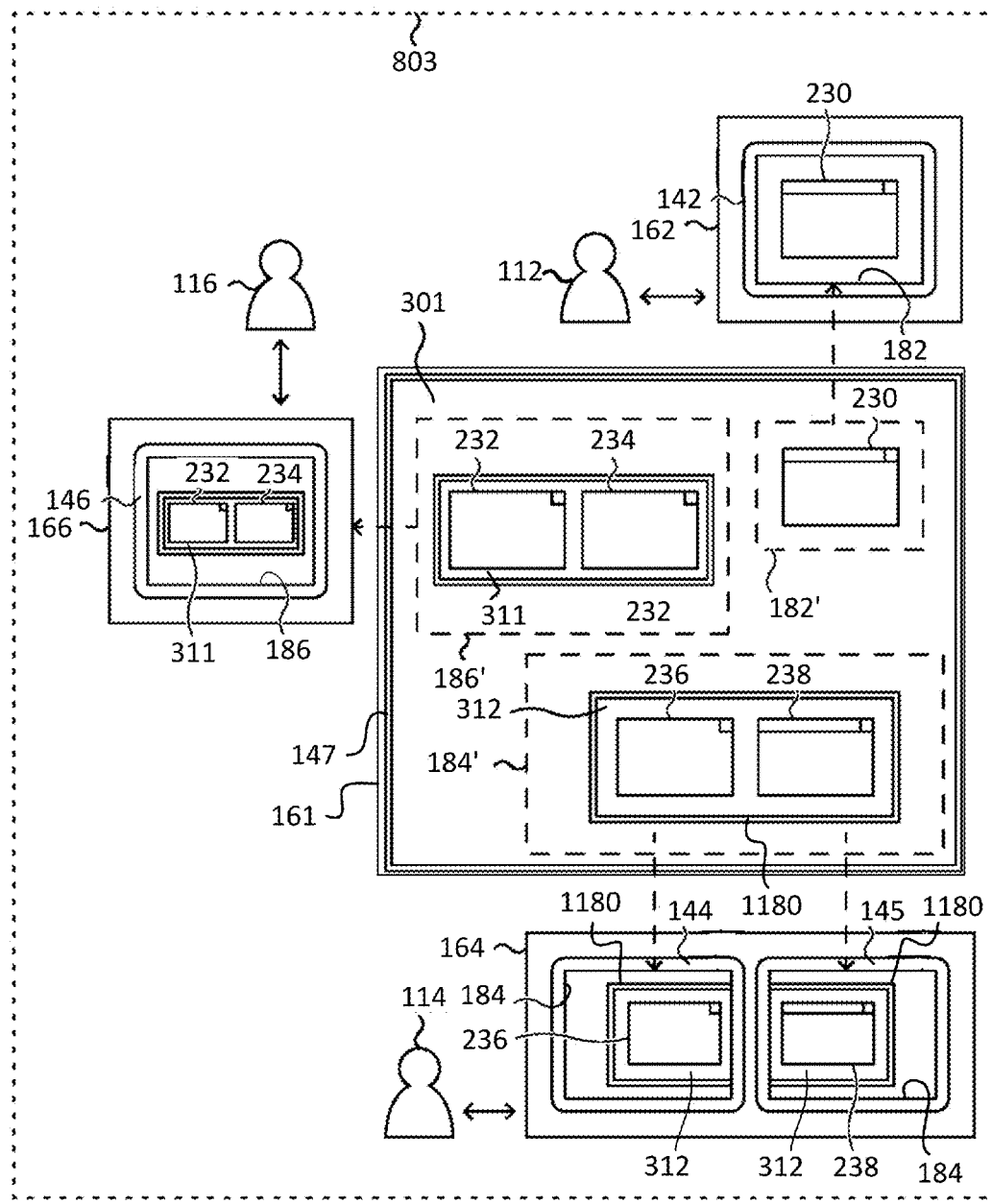
FIG. 5 illustrates a schematic block diagram of one embodiment of the present invention in which different users with individual viewports focus on different portions of a desktop environment presented on another device.

An embodiment of a system 803 in accordance with one or more aspects of the invention is now described with reference to FIG. 5, wherein three different users 112,114, 116, with different computing devices 162,164,166, are illustrated sharing a common desktop environment 301. User 112 uses computing device 162 having display 142; user 114 uses computing device 164 having two displays 144,145; and user 116 uses computing device 166 having display 146. In this example, the common desktop environment 301 is a desktop of computing device 161 having display 147. The owner or operator of computing device 161 with desktop environment 301 has enabled selective sharing of resource 230 and sub-environments 311,312 within the desktop environment 301 with users 112,114,116. Each of the users 112,114,116 has a respective viewport 182,184,186 that can be used to focus on or obtain a desired view into the desktop environment 301 by each of the users 112,114,116. In particular, the viewport 182 is used to focus on, gain a view of, and interact with, resource 230 within the desktop environment 301. Moreover, the area of the desktop environment 301 that is seen within the viewport 182 is graphically indicated on display 147 by outline 182'. In similar manner, viewport 186 is used to focus on, gain a view of, and interact with resources 232,234 within sub-environment 311, and the area of the desktop environment 300 that is seen within the viewport 186 is graphically indicated on display 147 by outline 186'.

User 114 is associated with computing device 164, which in this example comprises a dual monitor display setup having display devices 144,145, with viewport 184 extending across both display devices 144,145 of computing device 164. Nonetheless, the area of the desktop environment 301 that is seen within the viewport 184 is rectangular and continuous as illustrated by the area indicated on display 147 by outline 184', and viewport 184 is used to focus on, gain a view of, and interact with, with resources 236,238 within sub-environment 312 within the desktop environment 301. In alternative embodiments, each of the display devices 144,145 could be provided with a separate viewport rather than viewport 184 extending within each display 144,145, each viewport separately used to focus on, gain a view of, and interact with a resource of the desktop environment 301 that is seen through the respective viewport. In such alternative embodiments, the area of focus of each respective viewport would be outlined or otherwise indicated in similar manner to area 184' of viewport 184. Furthermore, while only three viewports 182,184,186 are shown in this example, more or less than three viewports can be provided focusing on the same or different portions of the desktop environment 301, as may be desired.

Viewport Display Configurations

FIGS. 6-8 illustrate exemplary viewport configurations on a display 148. In FIG. 6, the viewport 187 is coextensive with and covers or encompasses a substantial entirety of the screen or area of the display 148 of the display device 148. In FIG. 7, only a portion of the display 148 is encompassed by the viewport 187. In the example illustrated in FIG. 8, the display 148 has multiple, but separate, viewports 187,188 that collectively cover or encompass a substantial entirety of the screen or area of the display 148. In FIG. 9, an additional display 149 is combined with the display 148 to provide a dual-display system associated with a single computing device. In this illustrated example, the viewport 187 spans across at least a portion of both displays 148,149.

Figure 10:
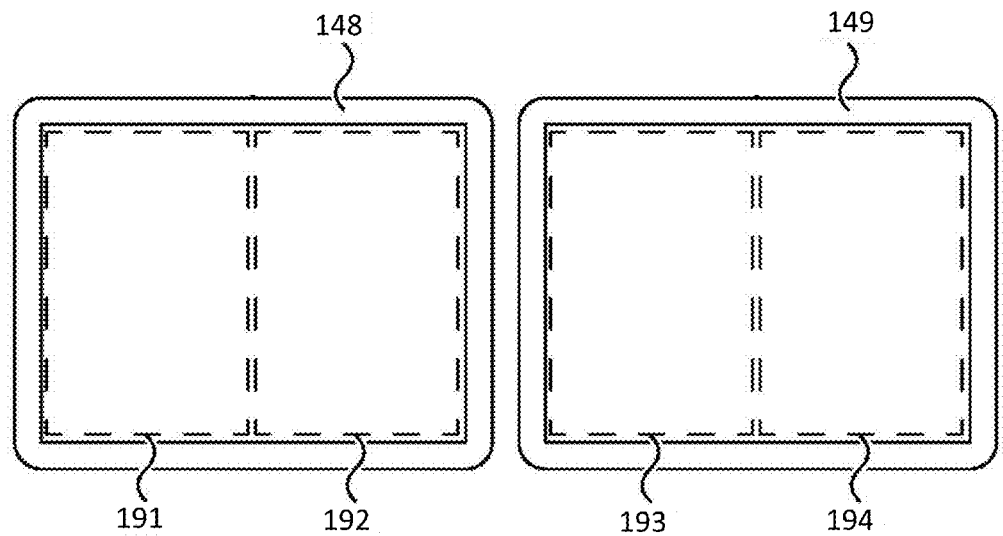
FIG. 10 illustrates an example of a display configuration of a viewport in accordance with one or more aspects of the present invention.

In a variation using the displays 148,149, which is shown in FIG. 10, four viewports 191,192,193,194 are utilized, with viewports 191,192 being shown on display 148 and viewports 193,194 being shown on display 149. Although four different viewports are shown in this example, more or less than four can be provided. The display devices 142,144 could be coupled to a single computing device 160, or multiple computing devices 160. Also, although each display device 141, 142 is illustrated in FIG. 10 as having two viewports 180, in alternative embodiments, each display device 141, 142 could include any suitable number of viewports 180, including more or less than two, encompassing any suitable portion of a display device 140.

In the example of FIG. 10, the viewports 191,192 and viewports 193,194 are shown in a substantially side-by-side arrangement, each encompassing approximately the same amount of the display area. In variations, the viewports can be arranged in any suitable manner including partially or completely overlapping on the respective display device, or encompassing different, unequal areas. Furthermore, the orientation of a viewport may be freely transformed in the area of display Moreover, while four different viewports are shown in FIG. 10, more or less than four can be provided, with each display including any suitable number of viewports encompassing any suitable portion of the display area.

Single Device, Multiple User Implementation

Figure 11:
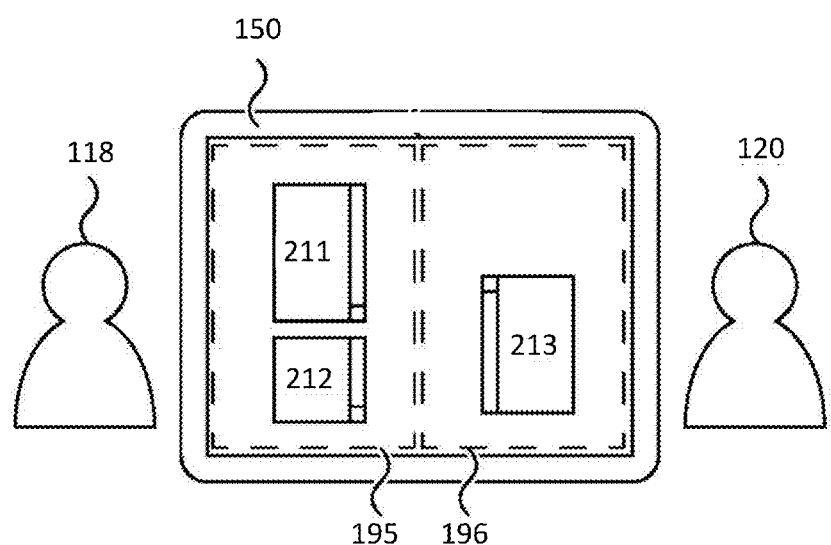
FIG. 11 illustrates an example of yet another display configuration of a viewport in accordance with one or more aspects of the present invention.

Referring to FIG. 11, in one embodiment, a computing device having a single display 150 is shared by multiple users 118,120 each having his or her own viewport to a shared desktop environment under his or her control. In this regard, viewport 195 provides to user 118 a view or focus to resources 211,212 in the shared desktop environment, while viewport 196 provides a view or focus to resource 213 to user 120 in the shared desktop environment. The viewports 195,196 are transformed or positioned in the display 150 so that each is visually oriented towards the respective user 118,120.

For instance, this embodiment allows co-located users 118,120 to work together on an interactive table or whiteboard, with each user 118,120 having his or her own viewport to content or resources and allowing each user 118,120 to work on his or her own or own shared resources and maintain his or her own workflow.

Shared and Non-Shared Resources Between Different Desktop Environments

Figure 12:
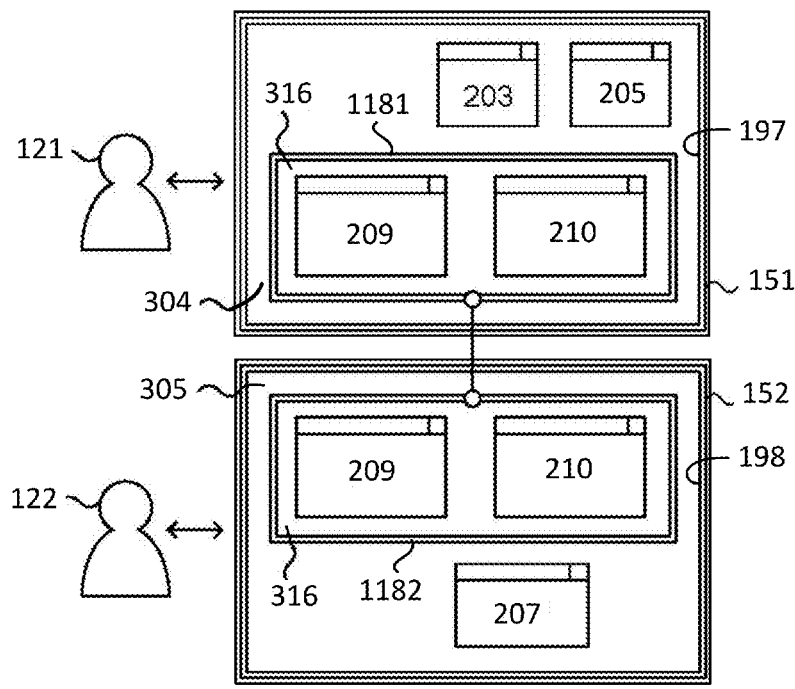
FIG. 12 illustrates a shared nested desktop environment in a system incorporating aspects of the present invention.

FIG. 12 illustrates an embodiment in which two different users 121,122 share access to a common sub-environment (also sometimes referred to as a nested desktop environment) from different desktop environments 304,305. As shown in FIG. 12, user 121 access desktop environment 304 using viewport 197 shown in display 151, and user 122 accesses desktop environment 305 using viewport 198 shown in display 152. Desktop environment 304 includes a desktop environment 316 nested therein, while desktop environment 305 includes the same desktop environment 316 nested in therein, in that each of users 121,122 has respective viewports in their own respective desktop environments 304,305 providing access to the same sub-environment 316. Furthermore, user 121 has to the desktop environment 304, including the other respective resources therein, while user 122 has access to the desktop environment 305 including the other respective resources therein, which may or may not overlap with the other respective resources in desktop environment 304. Specifically, user 121 has access to resources 203,205 as well as resources 209,210 in the sub-environment 316, while user 122 has access to resource 207 as well as resources 209,210 in the sub-environment 316. The shared sub-environment 316 is graphically represented in FIG. 12 by the line extending between and connecting viewports 1181,1182. In contrast, resources 203,205,207 are not illustrated as being shared between the users 121,122.

Hidden Resource, Shared Application

At this point it should be understood that a resource can be hidden, i.e., one that is not intended to be shared with other parties without explicit permissions, even though the underlying application is being shared. For example, some electronic mail or messaging applications will include pop-up notifications of an incoming email or message. In some circumstances, it may not be desirable to share such notification with other users, even though the underlying messaging application is the subject of a shared desktop environment. For example, in one embodiment, a hidden resource such as a notification will first appear in a non-shared portion of a user's desktop environment. The user can then determine whether to share the hidden resource, such as by clicking on or moving the hidden resource to the shared portion of the desktop environment 300.

Figure 13:
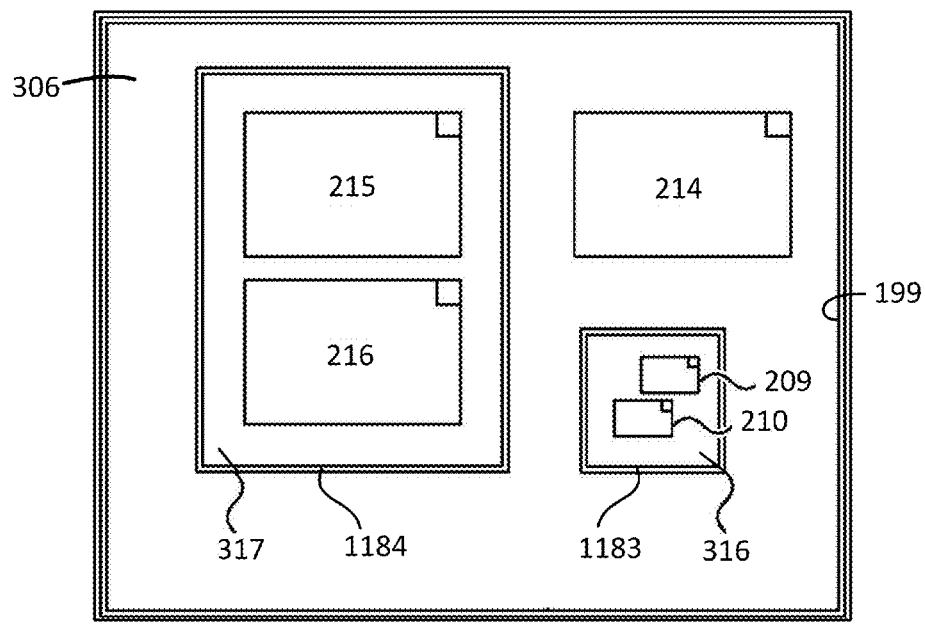
FIG. 13 illustrates another example of a nested desktop environment in a system incorporating aspects of the present invention.

Different Relative Scaling Between Sub-Environment and Parent Desktop Environment FIG. 13 illustrates another embodiment in which another user further has access to the shared sub-environment 316 of FIG. 12 using the viewport 1183 from a different desktop environment 306 as seen through viewport 199 in FIG. 13. As shown in FIG. 13, the nested environment 316 appears pushed down in desktop environment 306 so that the resources 209,210 of the nested environment 316 appear smaller in scale when compared to the resource 203 in the desktop environment 306, which for purposes of this example can be considered the parent desktop environment for the user. Conversely, a nested desktop environment may appear to be popped up such that resources therein appear to be on the same scale as the resource in the parent desktop environment, as illustrated for example by nested desktop 317 in which resources 215,216 are of equal size (i.e., the windows thereof) to that of resource 214 in the parent desktop 306. If the nested environment is pushed down, then a user can zoom in on that nested environment in order to see the resources therein in larger scale, leaving behind the parent desktop environment. In this manner, the aspects of the disclosed embodiments can provide an impression of a pushed down desktop environment, and zooming in on the pushed down desktop environment acts as a pathway to view just the nested desktop environment by the user.

Individual User Navigation of Shared Desktop Environment

Figure 14:
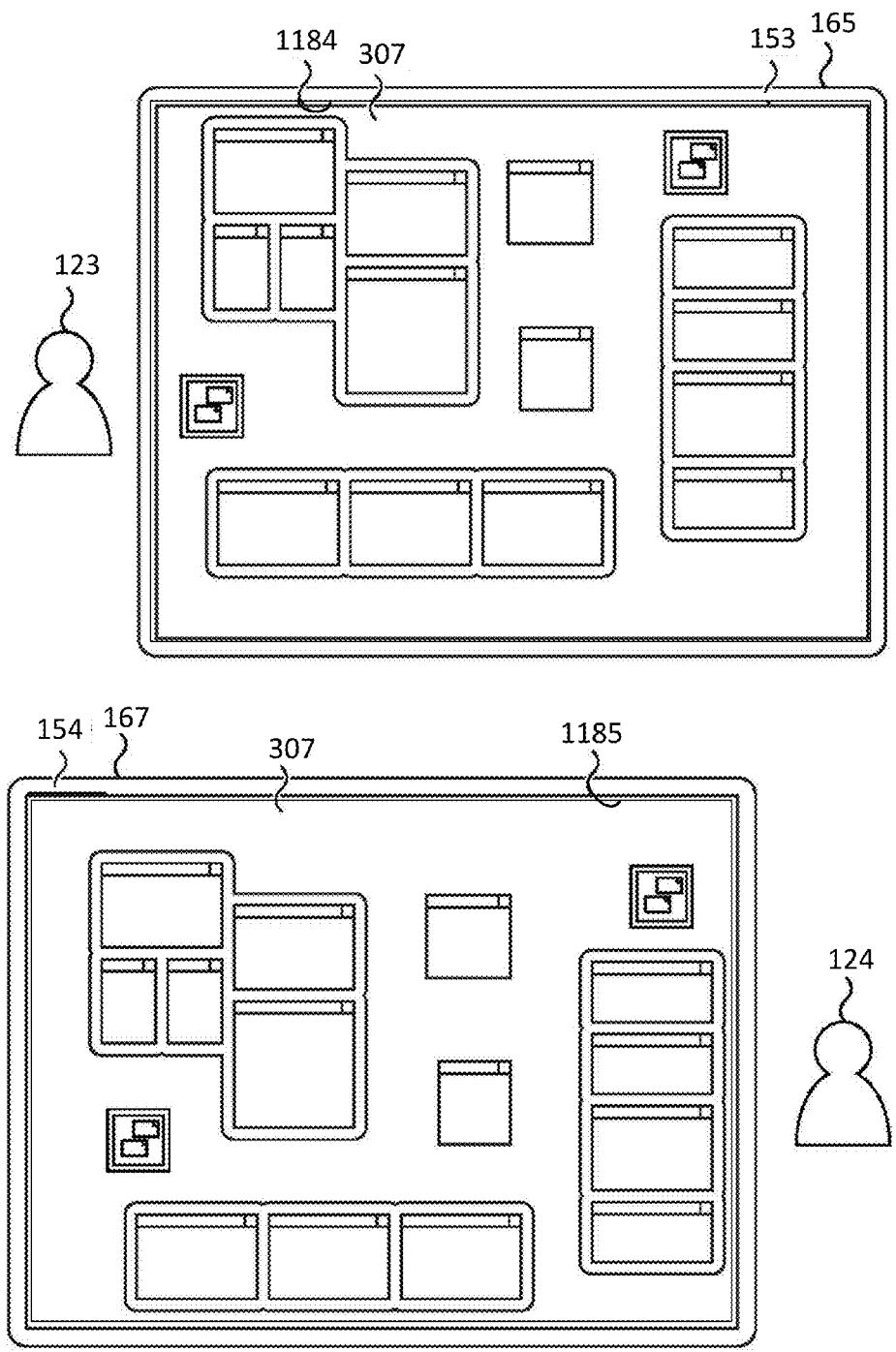
FIG. 14 illustrates one embodiment of sharing a desktop environment in accordance with aspects of the present invention.
Figure 14A:
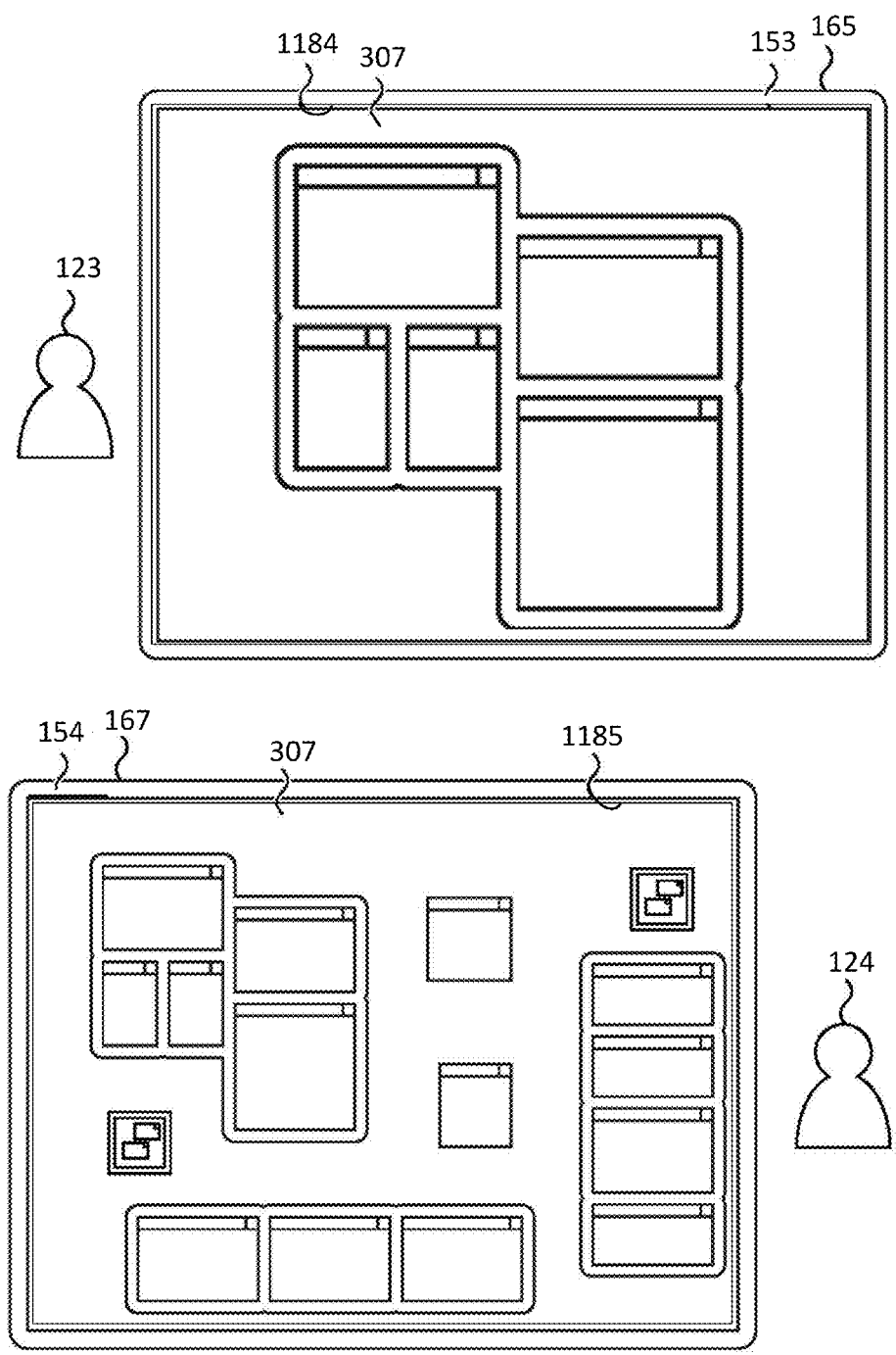
FIG. 14A illustrates navigation by a user in the embodiment of FIG. 14.

FIG. 14 illustrates an example wherein users 123,124 share a desktop environment 307 through separate computing devices 165,167. In this example, both users 123,124 have access to the same desktop environment 307. User 123 has a view of desktop environment 307 through viewport 1184 on display device 153 of computing device 165, and user 124 has a view of desktop environment 307 through viewport 1185 on display device 154 of computing device 167. Users 123,124 maintain their own respective viewports 1184,1185. In this way, each user 123,124 is able to simultaneously navigate to different parts of the same desktop environment 307, including to different resources and nested desktop environments, at the same time, using the different respective computing devices 156,167. For instance, if user 123 clicks on a resource group, that resource group becomes the focus of viewport 1184, with the view zooming in to that resource group as shown in FIG. 14A, without affecting the view of user 124 through viewport 1185.

Selective Sharing of Resources in Desktop Environments

Figure 15:
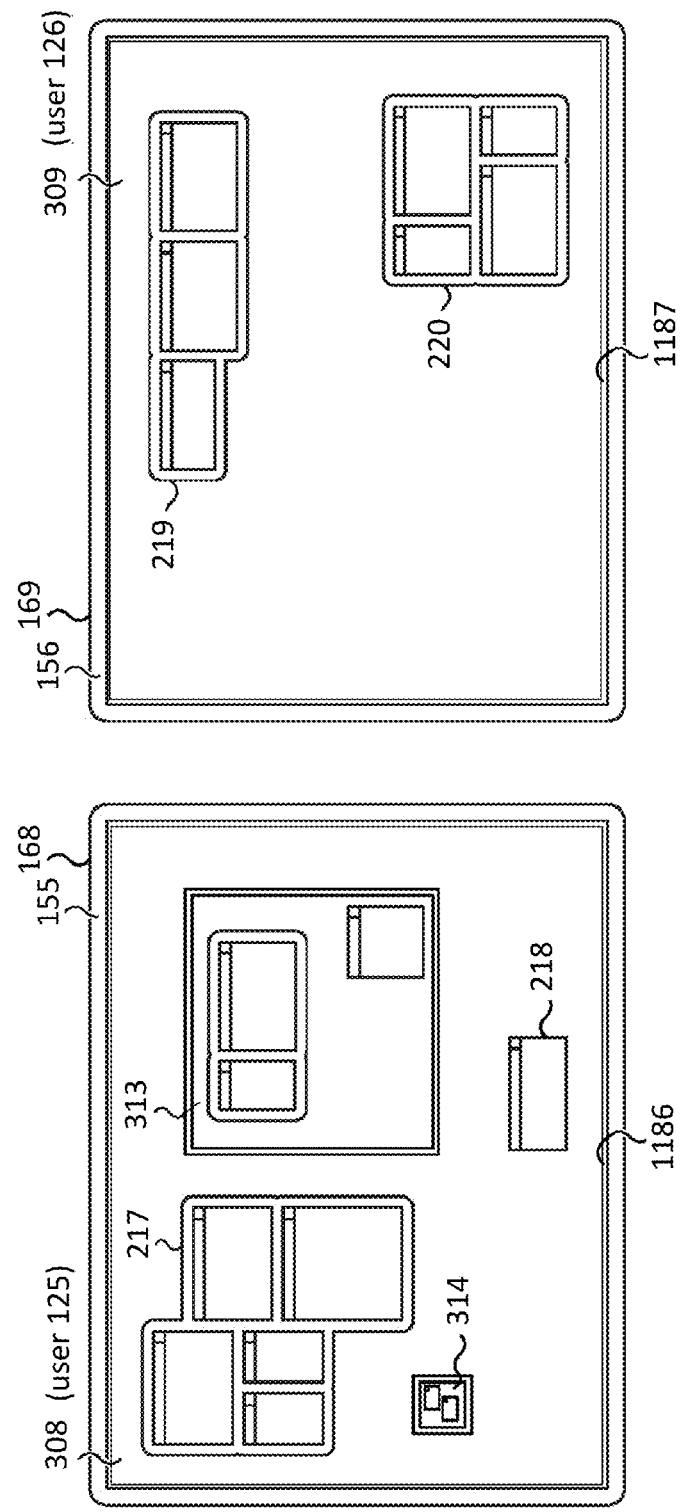
FIG. 15 illustrates two computing devices each having a desktop environment in a system incorporating aspects of the present invention.
Figure 16:
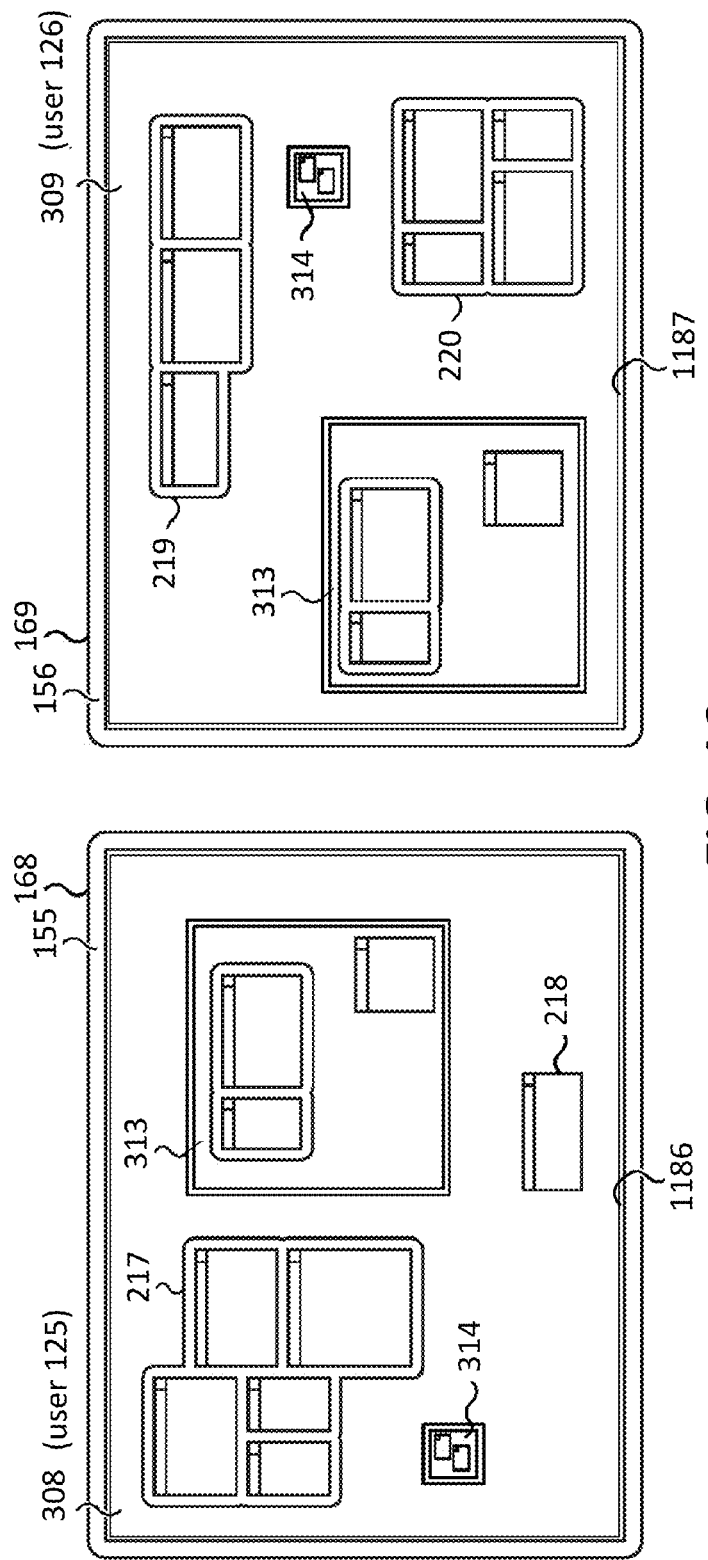
FIG. 16 illustrates another view of the computing devices of FIG. 15, wherein a resource and a resource group of one of the devices have been shared.

FIG. 15 illustrates an example wherein the viewport 1186 provides a view of and access to desktop environment 308 of user 125. User 125 uses computing device 168 with display 155. As also shown in FIG. 15, the viewport 1187 provides a view of and access to desktop environment 309 of user 126. User 126 uses computing device 169 with display 156. Desktop environment 308 includes resource 218; resource group 217; and sub-environments 313,314. Desktop environment 309 includes resource groups 219, 220. FIG. 16 illustrates the result from user 125 sharing resources from the desktop environment 308 with user 126. In particular, user 125 has shared sub-environments 313, 314, and sub-environments 313,314 now appear within the desktop environment 309 as seen by user 126 through viewport 1187. Consequently, as shown in FIG. 16, users 125,126 both see and have access to shared desktop environment 313 from their respective desktop environments 308,309; and users 125,126 both see and have access to shared desktop environment 314 from their respective desktop environments 308,309. Furthermore, both users 125,126 can freely position each shared desktop environment 313, 314 within their own respective desktop environment 308, 309 without affecting the other. It will further be appreciated from FIG. 16 that resource groups 217,219,220 and resources 218,314 are not illustrated in FIG. 16 as being shared between users 125,126 through viewports 1186,1187.

Figure 17:
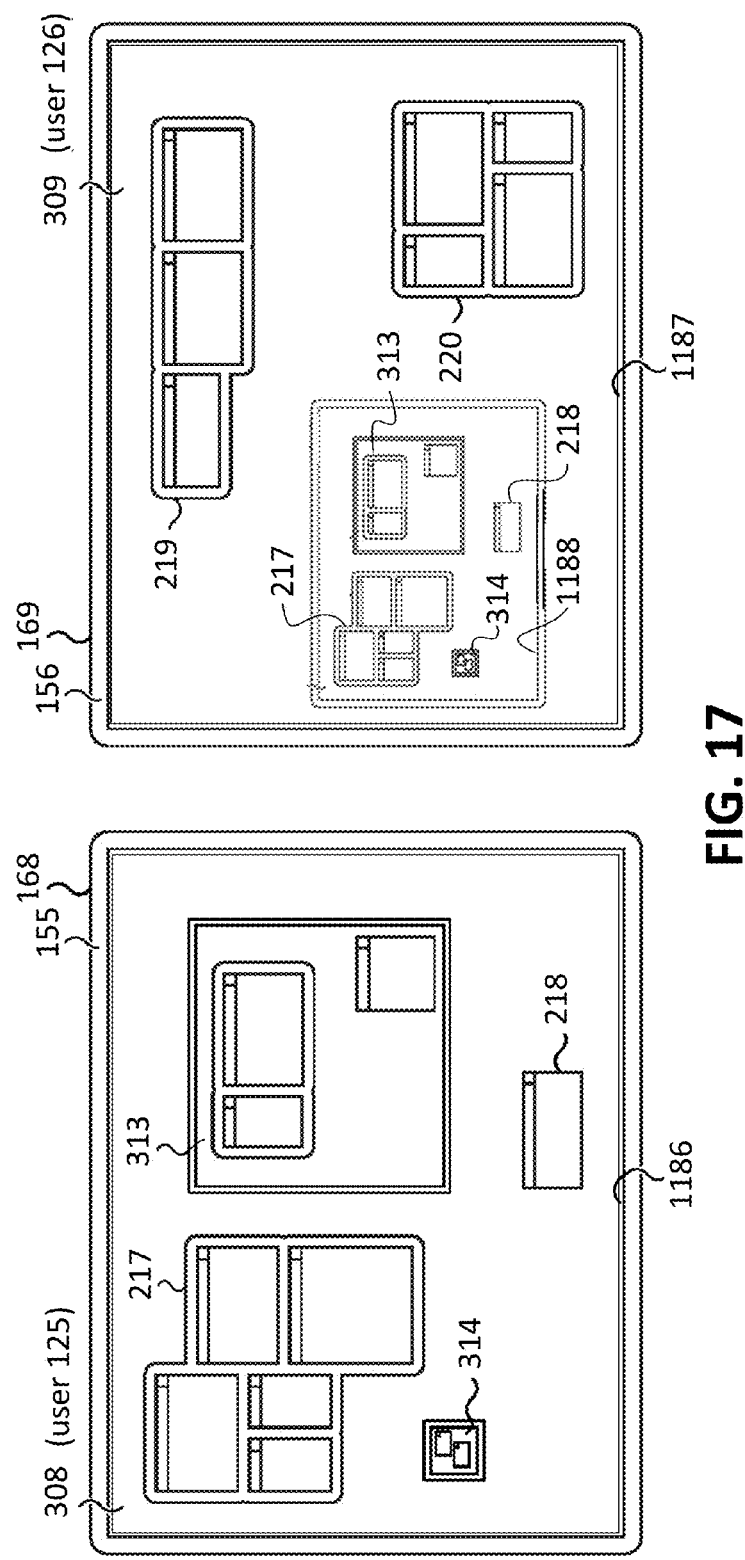
FIG. 17 illustrates another view of the computing devices of FIG. 15, wherein a desktop environment of one of the computing devices has been shared.

In contrast, FIG. 17 alternatively illustrates one example of the result from user 125 sharing the desktop environment 308 with user 126, rather than a subset of resources of the desktop environment 308. The desktop environment 308 shared by user 125 appears as a sub-environment in FIG. 17 as seen by user 126 through viewport 1188. In sharing the sub-environment, user 126 can position the resources seen within the viewport 1180 anywhere within their viewport 1181, as well as zoom in or zoom away from any of the resources seen within the viewport 1188 in the desktop environments 309 of user 126.

Designating Selected Resource/Resource Group for Sharing

Figure 18:
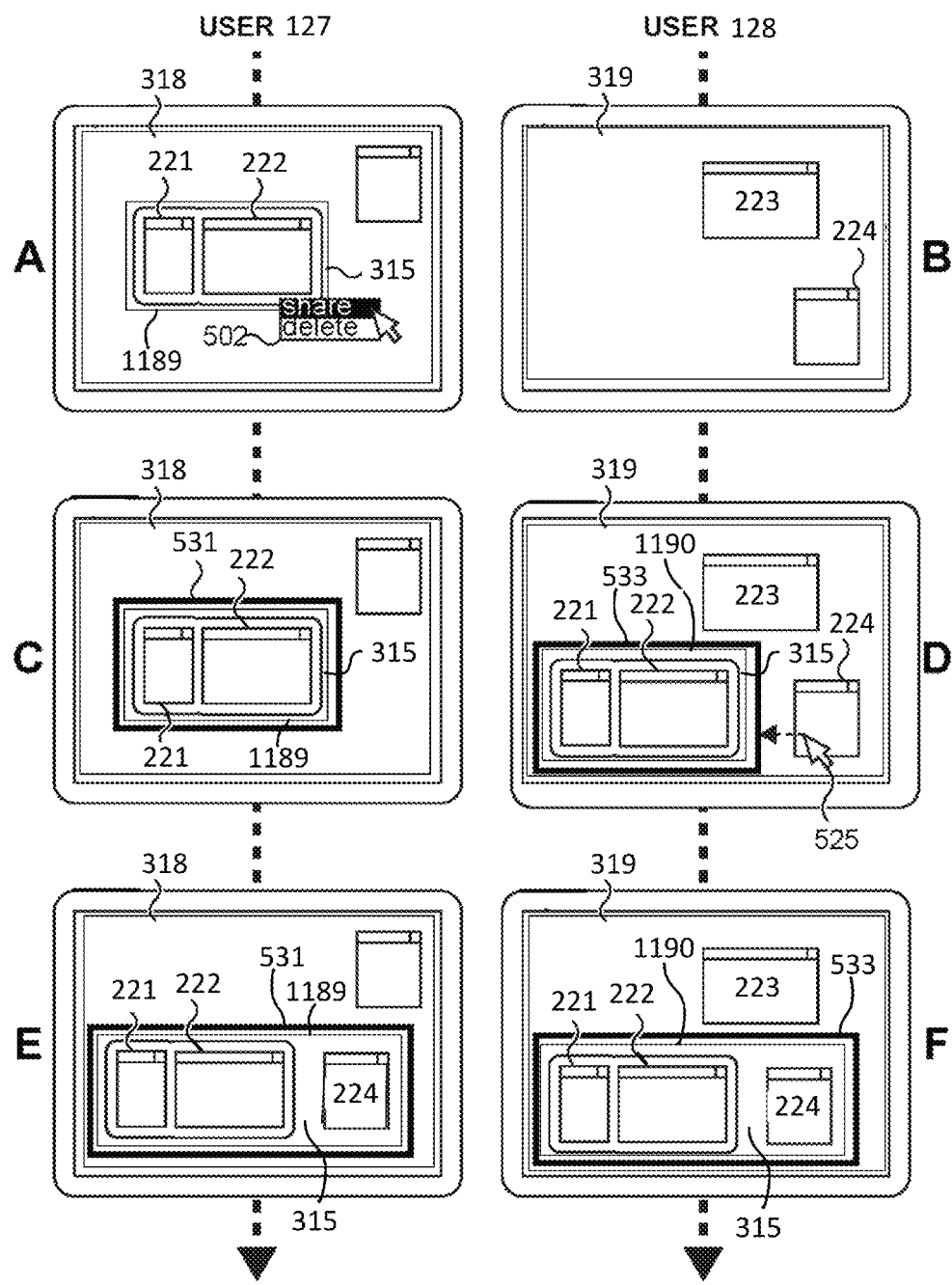
FIG. 18 illustrates one embodiment of a method in which two users may cooperate or establish a cooperative desktop environment for sharing resources in a shared desktop environment in a system incorporating aspects of the present invention.

In the sequence shown in FIG. 18, an embodiment of a method in accordance with an aspect of the invention is illustrated in which two users 127,128 establish a cooperative environment for sharing resources. Generally as illustrated, user 127 acting as a host invites the other user 128 as a guest to collaborate. Alternatively, a guest can request access to a resource from a host which the host can accept.

Thereafter, and referring to event A and event B, user 127 selects sub-environment 315 in parent desktop environment 318. Sub-environment 315 is seen by user 127 through viewport 1189 to contain a resource group comprising resources 221,222, and is selected by user 127 for sharing with user 128. As is shown at event A, context menu 502 is used to designate the selected resource group for sharing. As seen at event B, user 128 sees two resources 223,224 in desktop environment 319, and prior to being shared by user 127, user 128 does not see and does not have access to sub-environment 315. Once selected and designated by user 127 for sharing, as represented by the bold box 531 graphically shown around the resource group comprising resources 221,222 at event C, the resource group appears or pops-up in the desktop environment 319 of user 128 as sub-environment 315, as represented by the bold box 533 graphically shown around the resource group comprising resources 221,222 at event D. A new viewport 1190 provides a view to user 128 of the shared desktop environment 315 including the resource group. User 128 can add a resource to the shared desktop environment 315, thereby sharing a desired resource with user 127, permitting user 127 to access and interact with the added resource. This can be accomplished by dragging and dropping—or cutting and pasting—the desired resource onto the viewport 1190 used to access the shared desktop environment 315. The selection of the resource 224 also can take place using the mouse or other suitable keypad or keyboard function or command, such as the key sequence 'ctrl+c' or 'ctrl+x'. At event D, the user 128 selects a resource 224 from the desktop environment 319 to add to the shared desktop environment 315, using the selection indicator 525. When the user 128 adds the resource 224 to the shared desktop environment 315, as shown at event F, the resource 224 appears in the shared desktop environment 315 seen by user 127, as shown at event E. Both users 127,128 can view, focus on and interact with the resources 221,222,224 within the shared desktop environment 315, while users 127,128 maintain autonomy over the non-shared resources in their own respective desktop environments 318,319.

Single-User Desktop Environment Shared Between Multiple Devices

Figure 19:
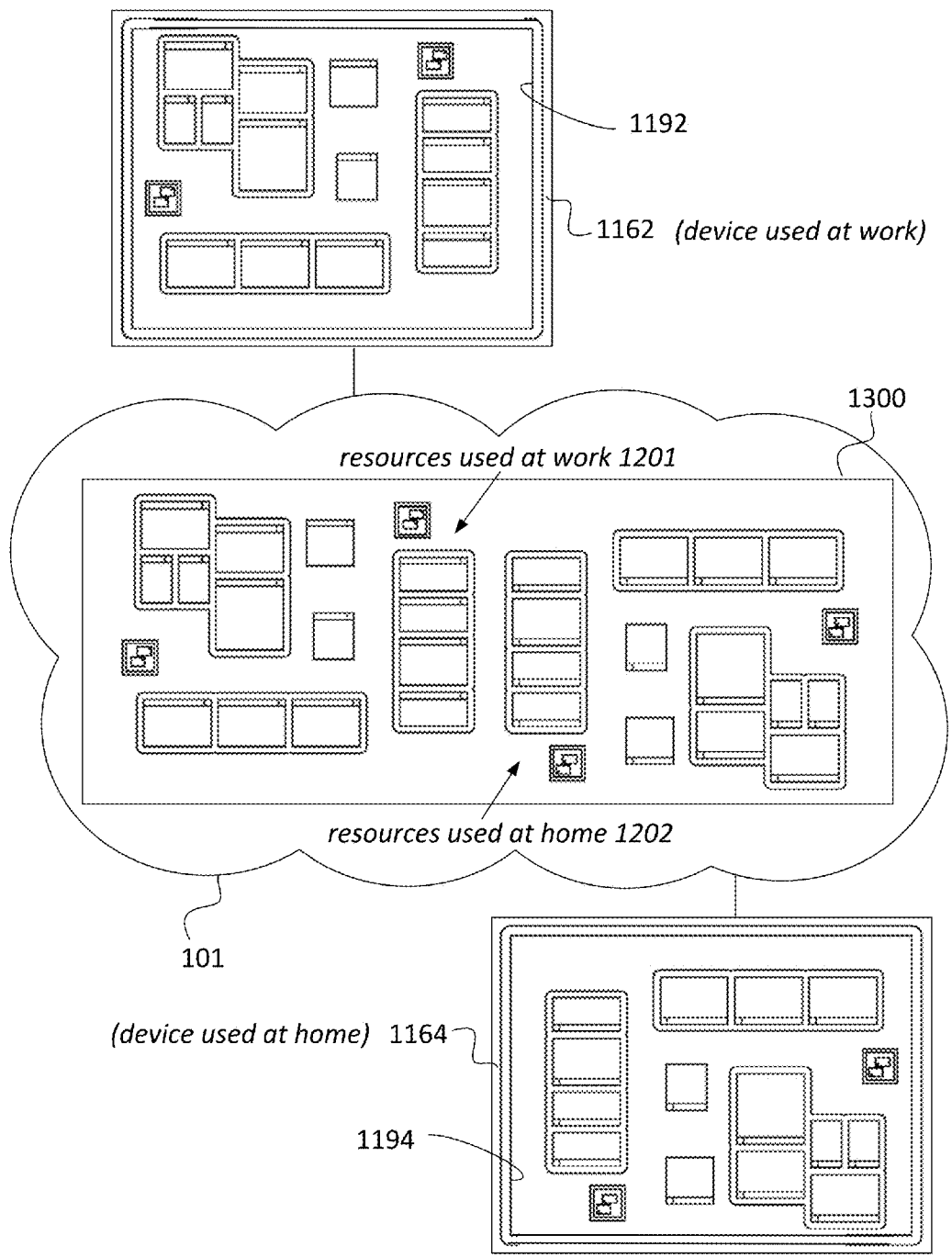
FIG. 19 illustrates one embodiment of sharing resources of a single desktop environment between different computing devices.
Figure 19A:
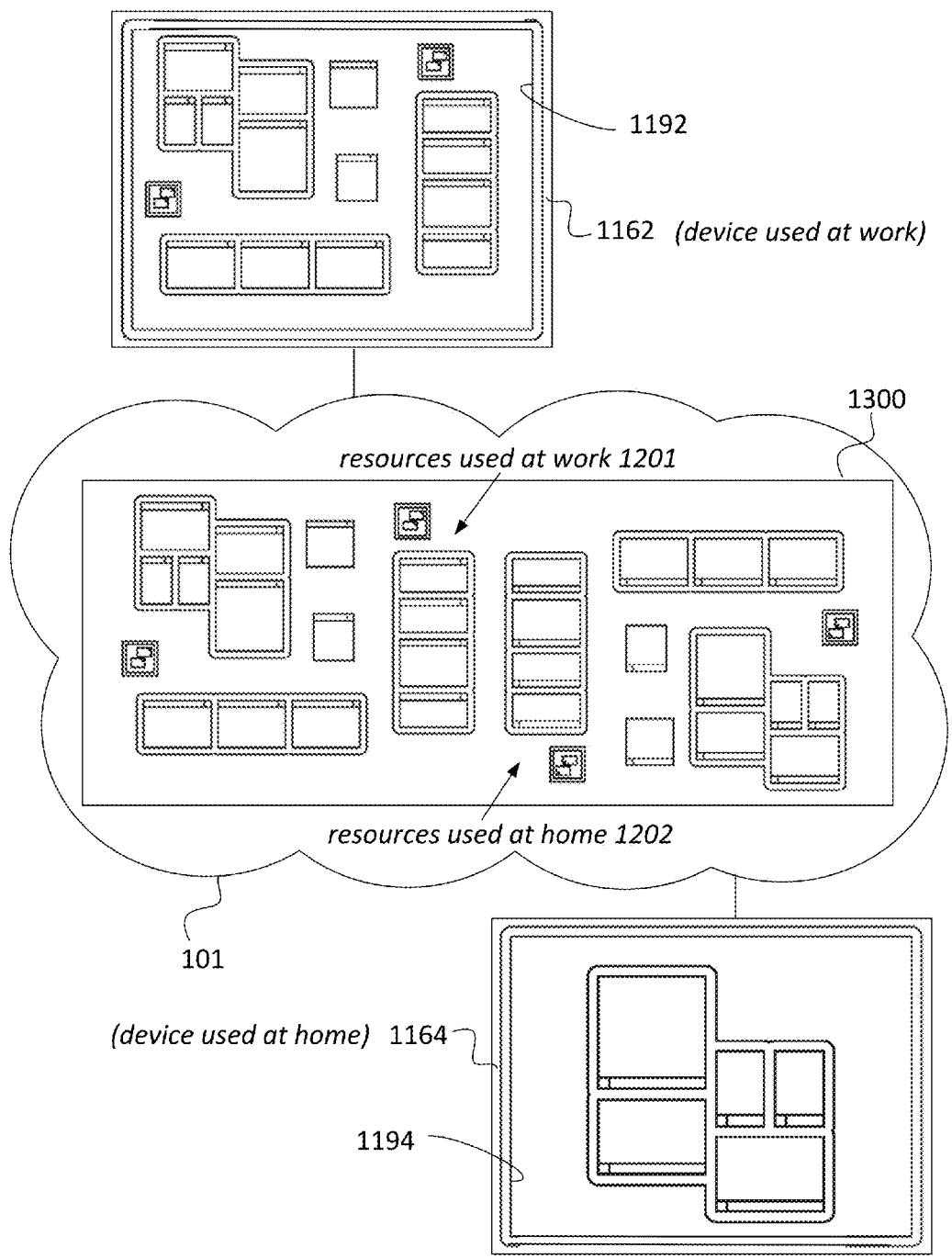
FIG. 19A illustrates navigation within the single desktop environment of FIG. 19.
Figure 19B:
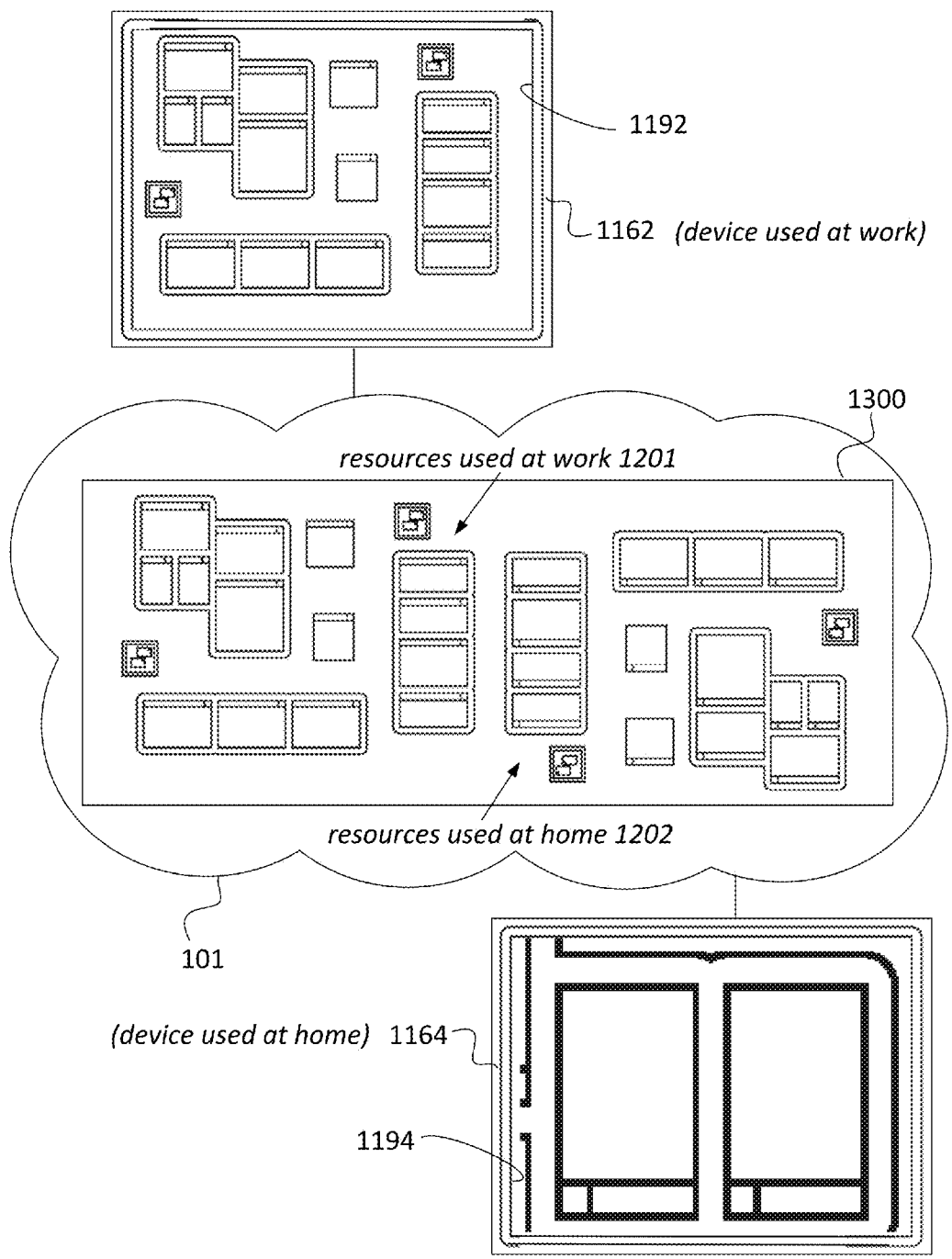
FIG. 19B illustrates further navigation within the single desktop environment of FIG. 19.

While the aspects of the disclosed embodiments are generally described herein with reference to multiple users, the aspects of the disclosed embodiments can also be beneficial for individual users. For example, with reference to FIG. 19, a single or individual user can use a system according to one or more aspects of the present invention to share a single desktop environment 1300 over the Internet 101 between a number of computing devices without affecting the layout of the resources on the shared desktop environment 1300. For instance, a user can organize resources 1201 used at work and resources 1202 used at home in a shared desktop environment 1300 so that the resources 1201,1202 occupy different regions of the shared desktop environment 1300. This enables the user to access both groups of resources 1201,1202 using different devices in different contexts (for example, using a computing device 1162 at the workplace or a computing device 1164 at home) without altering the layout of resources 1201,1202, thus avoiding the common problem associated with context switching, in which one or more resources may have to be activated and brought to the top or towards the top of the stack of resources in order to make switching between those resources more efficient, whilst reducing visibility and accessibility of resources used in other contexts in the process. Thus, for example, using the device 1164 at home, the user can navigate to a resource group (as shown in FIG. 19A) and then to a resource of the resource group (as shown in FIG. 19B) within viewport 1194 without affecting the layout of the resources displayed within viewport 1192 on the device 1162 of the user at work.

Visual Appearances of Viewports of Sub-Environments

Visual Indications of Sub-Environments

Figure 20:
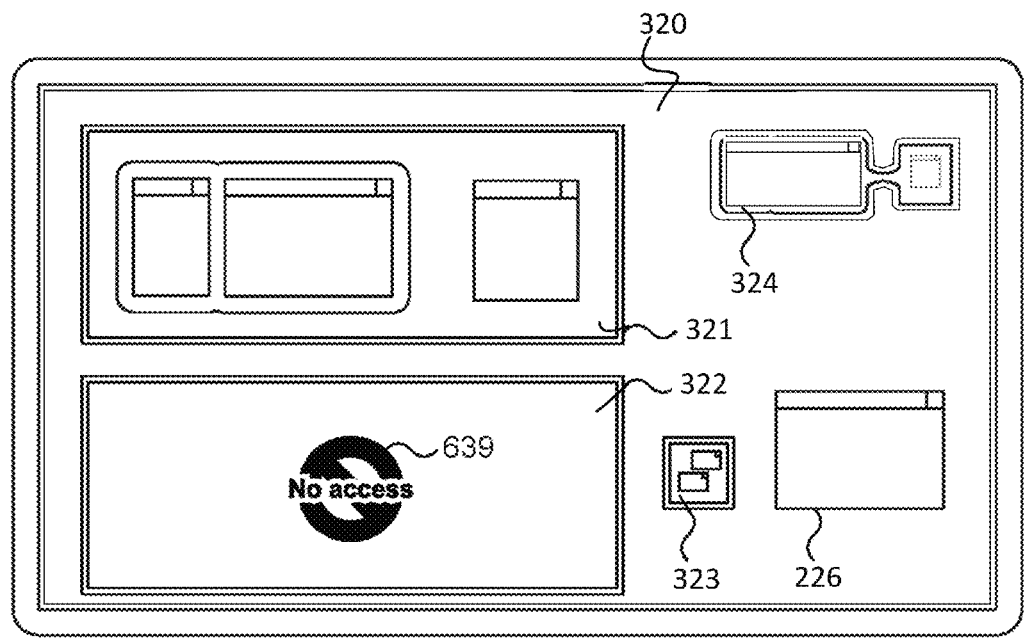
FIG. 20 illustrates an exemplary visual appearance of sub-environments in a system incorporating aspects of the present invention.

FIG. 20 illustrates one embodiment of an exemplary visual appearance of viewports for sub-environments 321, 322,323,324 within and relative to a parent desktop environment 320. Sub-environments 321 can be shown within a viewport in the same scale as the parent desktop environment 320, or scaled down as illustrated with respect to sub-environment 323. Furthermore, a viewport for a particular sub-environment can be in the form of a tile, as illustrated with respect to sub-environment 321; a viewport for a particular sub-environment optionally can follow the shape of the resources visually seen therein, as illustrated with respect to sub-environment 324, which is in the form of a silhouette of the resources seen therein; or a viewport for a particular sub-environment optionally can have any other suitable boundary shape. Sub-environments also can be visually indicated by graphical representations, such as color or icons and such. For example, an icon 639 is displayed in association with sub-environment 322 to indicate that this sub-environment is inaccessible from the parent desktop environment 320, wherein non-public details of the sub-environment are prevented from being viewed from outside of the sub-environment. Preferably, the sub-environment 322 cannot be viewed before access is granted, which can be advantageous in a situation, for example, where a meeting is held in a private sub-environment.

Viewport Indicators

Figure 21:
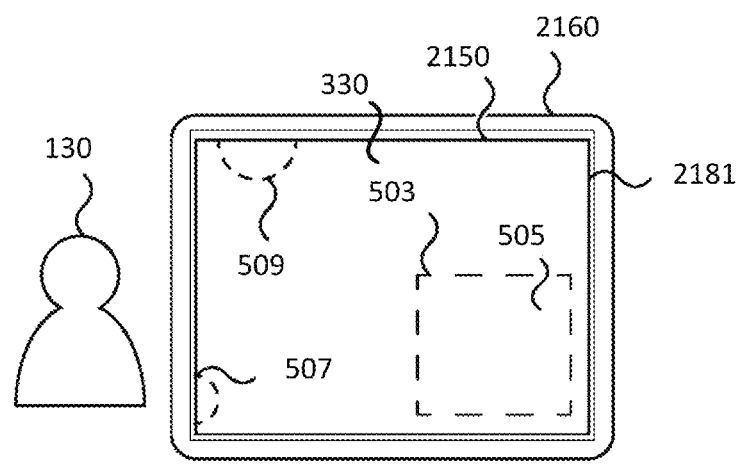
FIG. 21 illustrates one embodiment of position indication in a desktop environment in accordance with aspects of the present invention.

Referring to FIG. 21, in one embodiment the presence or position of viewports of others relative to a respective desktop environment 330 and, specifically, resources of such desktop environment seen through such viewports, can be graphically shown or indicated through viewport 2181 on a display 2150 of device 2160 to a user of the particular device 2160 For example, the area of the desktop environment 330 visible through a viewport of another user is graphically shown or displayed to user 130 by the rectangular outline 503, providing user 130 with a sense or indication of what resources with which the other user is working. The entire area of the outline 505 is encompassed within the area of the desktop environment 330 seen through viewport 2181 by user 130. In contrast, the area of the desktop environment 330 visible through a viewport of another, different user is not within the area of display of viewport 2181 visible to the user 130. In this situation, position indicator 507 is used to indicate the relative position of such viewport of the other, different user with respect to the current area of display of the viewport 2181 of user 130. In this example, the position indicators 507 is in the form of a half circle. Similarly, the area of the desktop environment 330 visible through a viewport of a third different user is not within the area of display of viewport 2181 visible to the user 130, and position indicator 509 is used to indicate the relative position of such viewport of the third other user with respect to the current area of display of the viewport 2181 of user 130. In these examples, the position indicator 507 is in the form of a half circle; however in alternative embodiments, any suitable shape, figure, icon or image can be used as a position indicator. An indicator may also comprise a live video image. Where a resource comprises a movie, a news or sports web page, a video, or a television news feed, such resources of a user's desktop environment can be used as indicators, thereby providing video feeds or live images for the different users. Furthermore, a relative proximity or distance of the user 130 to each of the other users whose viewports are off screen preferably is indicated, whereby an indication of both direction and distance (i.e., position) is given albeit relative and not absolute. In this respect, "distance" refers to a distance along desktop environment 330 between the area of desktop environment seen through the viewport 2181 of user 130 and the area of the desktop environment 330 seen through a viewport of the other user for which the indication is given. Repositioning of the viewport 2181 relative to the desktop environment 330, or scaling of the area of the desktop environment 330 seen through the viewport 2181, will alter such distance. Thus, with continuing reference to FIG. 21, the sizes of the half-circle 507,509 shown in viewport 2181 indicate the relative distances to the respective areas of the desktop 330 seen through the off screen viewports of the second and third users. Preferably, the smaller the half-circle, the further away the viewport of the other user is relative to the viewport 2181 of user 130. In this example, the larger size of indicator 509 relative to indicator 507 indicates that the viewport associated with indicator 509 is closer to the area of desktop environment 330 seen in viewport 2181 of user 130 than that of the viewport associated with indicator 507. In alternative embodiments, a smaller indicator relative to a larger indicator indicates closeness (smaller meaning closer). In one embodiment, the indicators 507,509 can further indicate relative overlap of areas displayed by viewports, as opposed to the distance separating such areas displayed by the viewports, especially when the areas seen by the viewports being to overlap. For example, in one embodiment, an indicator changes shape to a rectangle when at least a portion of the area of the desktop environment is seen through both viewports. The size of the rectangle could also be dependent on how far behind the user is or, alternatively, further indicates the portions of overlap in the areas of the desktop environment respectively displayed through the viewports.

Using Viewport Indicators to Facilitate Sharing of Resources

With further respect to indicators, in some embodiments indicators can be used to facilitate sharing of resources. Specifically, a resource preferably can be shared with another user by selecting or otherwise activating the indicator associated with the other user as the target destination for the selected resource The may be accomplished by selecting the resource and performing the 'ctrl-c' or 'ctrl-x' key sequence, and then clicking on the indicator followed by a paste function such as for example a 'ctrl+v' key sequence. In this way, a user can move or transmit files from one user to one or more other users without having to actually have overlap with the area of display of the other user's viewport, like in the sharing example described above with regard to the sequence shown in FIG. 18.

Proxies of Resources

In accordance with preferred embodiments, users are able to create proxies of resources, which proxies may also be considered resources themselves. Through proxies, one user can view or work on a resource separately, at a different location, than another user with respect to the same resource. It also is preferably to interact with a proxy wherein different proxies illustrate different representations of the original resource This allows the original resource to remain it its initial location within the desktop environment, with one or more proxies of that resource being shown on the desktop in one or more different locations.

Figure 22:
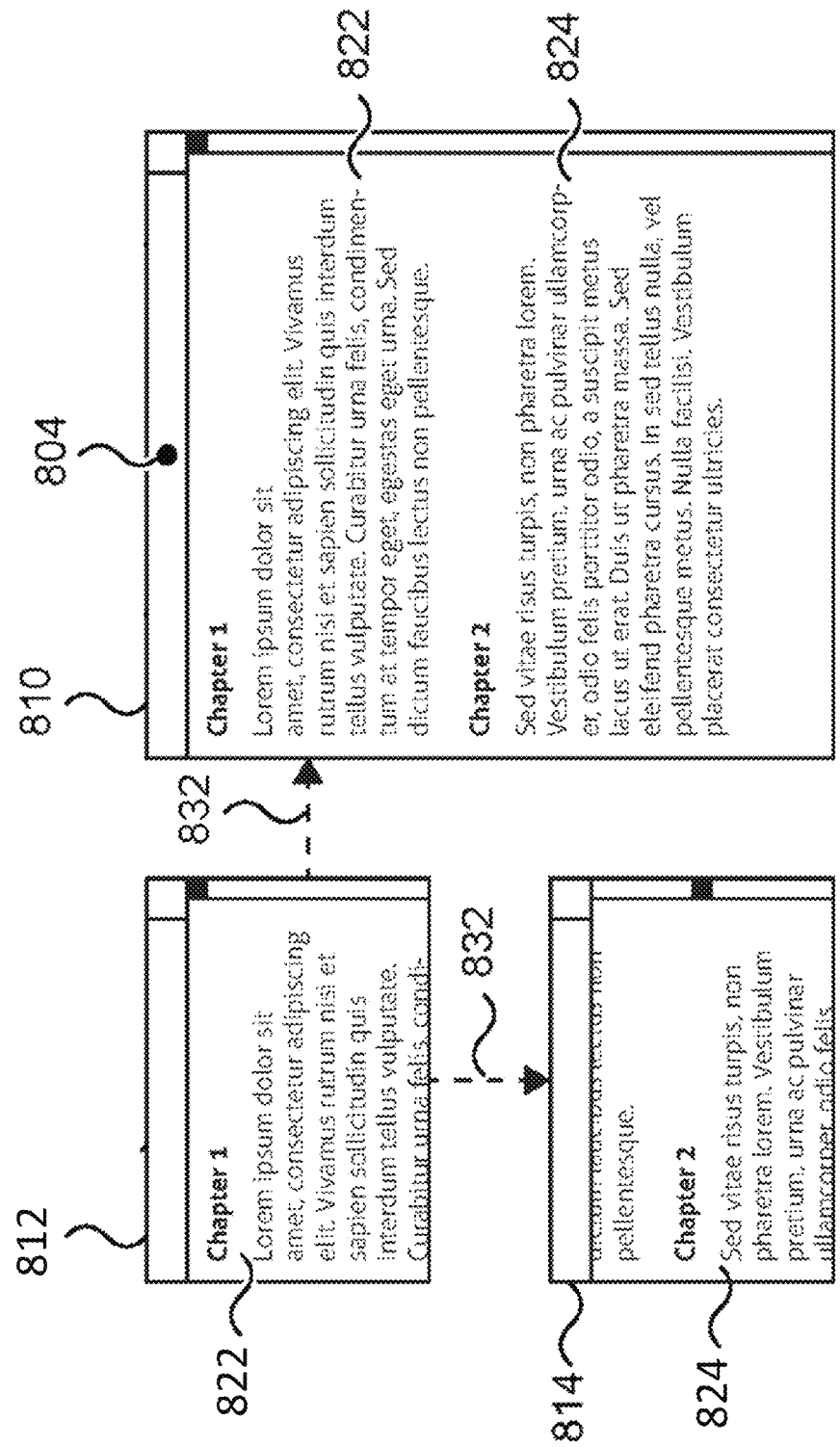
FIG. 22 illustrates one embodiment of proxy creation in a system incorporating aspects of the present invention.

For example, referring now to FIG. 22, in one embodiment a resource comprises a window showing a text based document or a text file 812. The proxies 810,814 enable independent view of paragraphs 822,824 of the text file 812 whereby, for example, paragraph 822 can be edited via proxy 810 by one user, while paragraph 824 can be edited via proxy 814 by another user. This allows a user to work with a resource without affecting the working context of other users. As another benefit, a window that is customarily in a specific position in an environment can remain in that position. A user can create a proxy of the window with which to work, and other users will still find the original window where they would expect to find it in the environment.

Proxy Indicators

In an embodiment, a proxy includes an indicator identifying that it is a proxy and not an original resource. For example, proxy 810 in FIG. 22 includes the indicator 804, which can comprise any suitable indicator, such as for example a geographical symbol, icon, highlight, image or colored dot. Identifying a resource as being a proxy using such a visual indicator enables a user to determine if another user is working on an original resource through a proxy, and further determine, for example, if a proxy can or should be disposed of.

Indicator of Original Resource for Proxy

As shown in FIG. 22, in one embodiment, a visualization or visual indicator 832 is provided that indicates the original resource, which visualization can be helpful in locating the original resource. For example, looking for relevant information about information in a proxy can involve locating the original resource, which may have related resources in its vicinity assuming relevant resources have been arranged close to each other. This is made easier if there is a visual indicator or visualization of where to find that resource.

In the example shown in FIG. 22, the indicator 832 is in the form of an arrow leading from the original resource 812 to each proxy 810,814. The indicator 832 may be provided or made visible when a proxy 810 or 814 is clicked-on, thereby indicating the origin (original resource) of the proxy, such as by pointing an arrow to it. Additionally, in one embodiment, the most recently used proxy for each resource can have a different indicator than the other proxies. A proxy indicator can also be configured so that it provides an indication of when the proxy was used, such as a strength indication.

In an embodiment, the original resources 201 may not be removable until all proxies 810 have been removed from the desktop environment 300. In an embodiment, a proxy enables a user to provide others with access to an original resource, even in another desktop environment, and keep track of where the resource is seen and used, such that the user does not have to move the original resource, and the indicator of a proxy can help the user keep track of their own resources 200.

Sharing by Proxy in Sub-Environment

Figure 23:
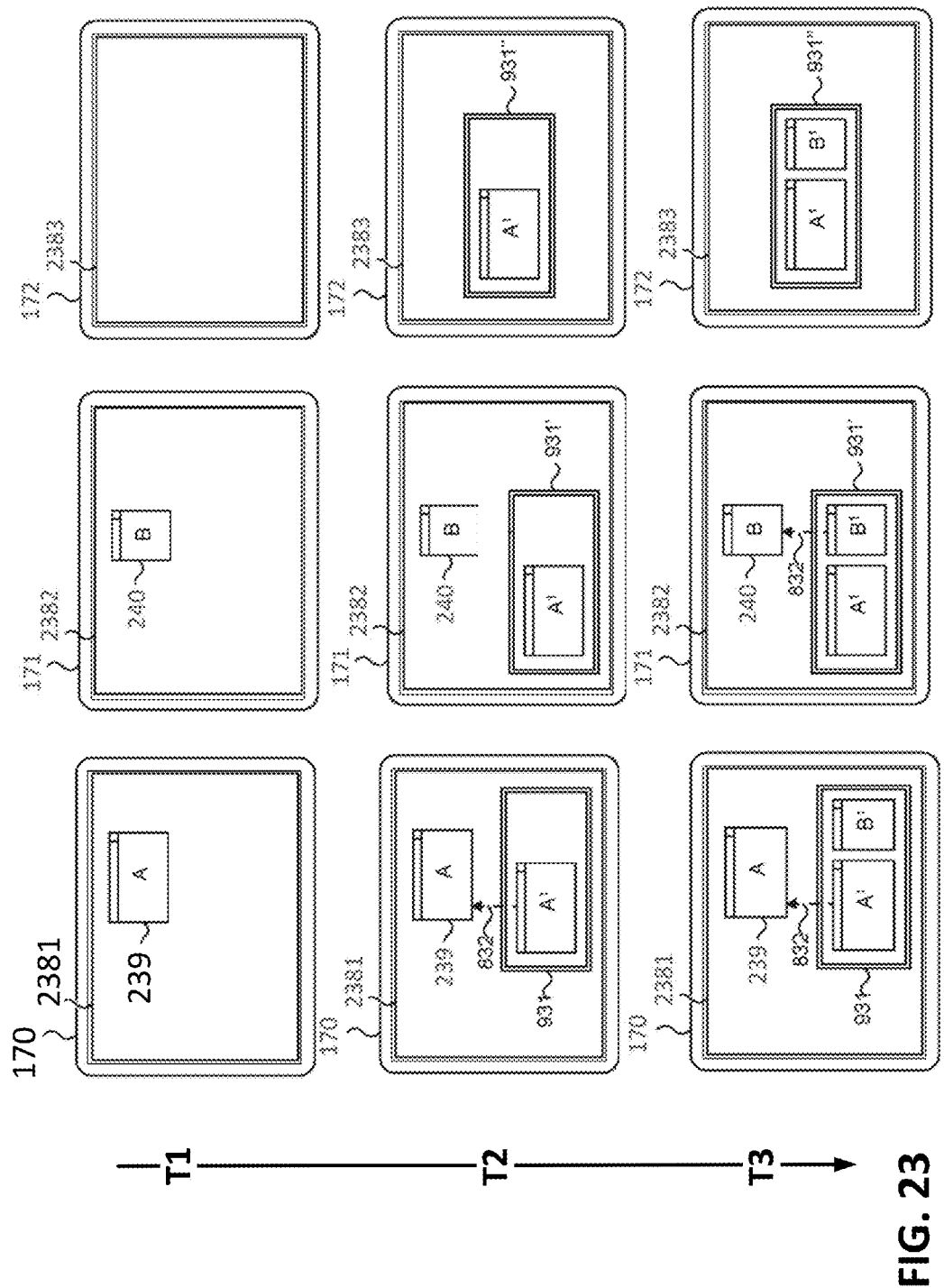
FIG. 23 illustrates an embodiment of resource sharing between users in a system incorporating aspects of the present invention.

FIG. 23 illustrates an embodiment of a process in which a first user device 170 and a second user device 171 are configured to share content or resources to and between each other, as well as with a third user device 172. In this example, the first user with the first user device 170 shares only content A from the resource 239 and the second user with the second user device 171 shares only content B from the resource 240. First, at time T1, the first user device 170 includes resource 239 having content A, and the second user device 171 includes resource 240 having content B. Neither content A nor content B is shared between the devices 170,171,172 at this time. At time T2, a proxy group 931 is formed and presented on the display device 170 of the first user device 170. The first user may create the proxy group 931 (for example by accessing a context menu of an existing environment and selecting a menu option corresponding to the creation of a new environment). Furthermore, at this time a copy of the content A is added to the proxy group 931, which content may represent only a desired content portion of the resource 239, referred to here as A1. The proxy group 931, including the copy of content A as A1, is shared with the second user device 171 and a version of the proxy group 931 is presented on the display device 171 as proxy group 931'. Similarly, the first user also shares the proxy group 931' with the third user device 172, which is presented on the third user device 172 as proxy group 931". At time T3, the second user adds a copy of content B shown in FIG. 23 as B1 to the proxy group 931', thereby content B1 visible in the proxy groups 931 on user device 170 and in proxy group 931" on user device 172. The resulting views in viewport 2381,2382,2383 of respective devices 170,171,172 are shown in FIG. 23 at T3. In one embodiment, the proxy group 931 can be passive or be configured to be edited by designated users. For example, in one embodiment, the content A1 can be edited by the user of the first device 170, the content B1 by the user of the second device 171, while the user of the device 172 is not enabled to edit either content A1 or content B1. Generally, any of the user devices 170,171,172 that are configured with Read/Write privileges, as those are generally understood to be known, can edit any content within the proxy groups 931,931',931".

Abstract Resource Layouts

The layout of resources in a desktop environment can be specified in an abstract fashion. This can be done by specifying their relations towards each other, such as for example "resource a left of b"; or "resources g, h, i, j, k, l, m belonging to the same group where central resource g is surrounded by resources h–1"; or "resources n, o, p, q, r, s, l with parent-child relationships parent(n, o), parent(n, p), parent(o, q), parent(o, r), parent(r, a), parent(r, l)". This advantageously allows the resources to be shown to different users in different dimensions. For example, users with computing devices that have different characteristics, such as resolution, can share the same resources and the layout of resources, even though they may see the resources differently on their respective display devices. For example, the same resources could be presented with different dimensions and arranged differently to different users in absolute coordinates depending upon the resolution of the display device used. Nested environments might be shown minimized on display devices with a small display resolution.

Window Minimization to Taskbar

The aspects of the disclosed embodiments generally enable that the windows or resources on the desktop that the user wants to see or work with are not minimized to the taskbar, while alerts and other windows can be minimized A taskbar is generally understood as a temporary storage facility for windows that are not currently used. However, this feature does not work well in a desktop environment that is shared by multiple users because another user might need a window even if one user currently does not. Thus resources that the user is working with or wants to see are generally not allowed to overlap or be minimized, and resources in the same desktop environment will typically be easy to locate, since one resource will not be in the taskbar or be positioned behind another resource.

Shared Sub-Environments for Meetings

In accordance with aspects of the invention, sub-environments can be shared between different users on different devices for a meeting, with all parties to the meeting being able to have the meeting within the context of their own respective parent desktop environments and associated resources. For example in a meeting between two users, or groups of users, one of the users shares a sub-environment with the other user. The other user opens the shared desktop environment in their desktop environment. During the meeting, one user can have the sub-environment minimized or pushed down while the other user has it maximized or zoomed-in. Still, both users now can have the sub-environment as part of their own respective parent desktop environments with their own respective resources positioned nearby the shared sub-environment. Furthermore, another user or group of users taking part in the meeting could access the shared sub-environment from the context of their own resources. For example, a user could open a web browser and locate a certain resource in the context of his or her own resources before sharing it with others in the sub-environment in which the meeting is taking place.

It should also be appreciated that users can have multiple nested meetings at the same time in the same environment. For example, a user could start two or more meetings at the same time. Each meeting could have one or more additional nested meetings with other users. A user could have separate meetings going on with different users. The user can move between the two or more meetings on that user's parent desktop environment.

Furthermore, in one embodiment, if the amount of activity detected in a sub-environment is at or below a pre-determined threshold level, meaning little or no activity is taking place within the sub-environment, then the sub-environment can be minimized automatically by zooming out in order to save display space. In one embodiment, minimization of desktop environments could be used to provide a confined work area for a group of users. Navigation, for example, could be confined into a sub-environment as long as the user does not zoom out of the sub-environment.

Additionally, in one embodiment, a nested environment may not be not intended to be used directly from the parent desktop environment, meaning that, for instance, clicking within the region of a nested environment will not have an effect in that environment but may, instead, be interpreted as a command to zoom into that nested environment. The nesting of environments may also support optimization of network bandwidth use and uses of other resources, e.g., because less image data needs to be transmitted over the network when some windows will appear in smaller scale and can be represented using smaller resolution images. The small visual representation of resources also may not need to be updated frequently, even if visible to the user, assuming that the user is not actively following a desktop environment that is show in a small scale on the display.

Indicator of Remote/Distributed Desktop Environment

In one embodiment, a graphical indication is provided that visually informs the user whether a desktop environment is a remote or distributed environment. This will make users aware of whether they are operating in a volatile setting, generally meaning that the user can be aware if a change they are planning to make to a resource, such as a file, can be undone, damaged or lost if the network connection to the remote environment is interrupted. The indication will also allow the user to determine if actions in the remote or distributed environment may be perceived by others.

Supporting Different Computing Devices

Preferably, software enabling embodiments of the invention provides support to different computing devices. For example, different computing devices may be used having different display resolutions or configurations. In one embodiment, a determination is made whether to present sub-environments within a desktop environment in either a minimized or maximized view, to match the specific user needs and resources. The determination can be made by the user or automatically based on characteristics of the computing device, such as for example, display resolution and configuration, such as the presence of a dual-screen or monitor display device where a shared environment can be presented on or across one or both of the display devices.

Access Rights

An environment and resources can have access rights so that they are not freely accessible to all users. Furthermore, an indication can be provided that visually represents in a graphical manner to a user the level of rights and/or privileges that are required to access the specific environment. Certain credentials may need to be provided, such as a user name and password, for example. Rights and privileges can include for example, but are not limited to, read, write, execute, copy, cut, move, delete, and resize. In alternative embodiments, suitable rights and privileges can be encompassed. Providing access rights, and different levels of rights and privileges, can be beneficial in the multi-user desktop environment in order to control what users can do. It may be desirable to ensure that certain users, or user groups, do not view, move or edit resources that should only be seen, managed or edited by some users. It may also be desirable in some cases to specify, for example, that certain resources cannot be moved to another desktop environment that requires different access credentials to avoid accidental disclosures to parties that should not have access to a particular resource or resources. Furthermore, in an embodiment, a user can dedicate an environment to those resources that the user is willing to share to another user. This can be advantageous, for example, in remote support situations where the user needs to allow another user, such as for example a technician, to assist with specific resources, such as application windows.

Resource Layout to Avoid Obstructed Viewing

In at least some embodiments, the resources within desktop environments generally do not overlap, or substantially obstruct the content of one another. For example, when a resource is added to an environment, the added and preexisting resources are arranged so that there is no overlap or substantial obstruction of content of the resources. A size and position of the viewport can also be rearranged to minimize distraction from the layout change. Moreover, when a resource that is currently being viewed by a user moves on the desktop environment independently of the actions of the user, the viewport of the user may also move. This will be beneficial to avoid the user from being distracted by changes in the position of the resource 201, or even lose resource entirely out of his or her sight.

In an embodiment, the layout changes are recorded and saved in memory for future use, such as for example, playback. In one embodiment, when a resource is moved, such as by dragging, so that it occupies the same area of the environment as another resource, then the resource may show primarily on top of any other resources in the environment. If multiple resources are being moved at the same time, the moved resources appear to overlap.

Preview and Invitation to Shared Environment

A desktop environment that is designated to be shared may also be temporarily shown to the user prior to sharing. For example, the portion of the environment to be shared may be moved into the viewport of the other user, in which case the other user will automatically receive a question from the system asking whether the other user wishes to see the contents. The question can be presented in the display area of the display device of the other user. In one embodiment, the other, target user has to accept the portion of the environment to be shared prior to being shared In an alternative embodiment, a resource rather than an environment could be selected to be shared in similar manner.

User Grouping

Users may be grouped based on relative positions of the users. For example, users close enough to each other can belong to a group of users. Alternatively, users working on a specific group of resources in a specific area of an environment, or in a specific environment, can be grouped together. Grouping can be used to enable messaging, generally meant to encompass the transmission of text, voice and video of the user, between certain users.

In an embodiment, a custom shape aura with a specific extent to each direction is provided around a user or group of users, which may be indicated visually, and can be used to determine if two given users belong to the same group. Users may also be able to form groups explicitly or define explicitly that they do not belong to one or more groups. Groups may also have access policies such that a user has to be accepted to a group, and may be required to provide log-in credentials. Groups can also have time-dependent membership policies such that group membership may persist for a certain time period even if a group member is not within the group reach, meaning the aura of the group could also be determined by distance, whether indicated visually or not.

In one embodiment, group of users may be indicated to each other so that users can identify who belongs to which group, both in a zoomed in and zoomed out view. In one embodiment, a group member's indicator may be connected with visual connectors, such as lines of a specific type, weight or color, in zoomed out or zoomed in views. By visualizing the aura of users and groups when zoomed out, connected auras may indicate belonging to the same group or may have auras of the same color. A common indicator, such as a circle, triangle or other suitable shape, can be used for users in the same group, to indicate group membership, such as for example in a zoomed-in view, where aura may not be displayed in order to avoid visual clutter. Groups may also be indicated differently depending upon whether a user belongs to a group.

For example, in those groups where a user belongs, the user indicator can be a live video image, while indicators of users who belong to other groups may be icons. If a user belongs to multiple groups, the indicators of members in different groups, such as the live images, may be grouped spatially or by being connected visually, using for example, lines or appearing inside the same shape visualization.

Resources of Multiple Devices in Single Desktop Environment

Figure 24:
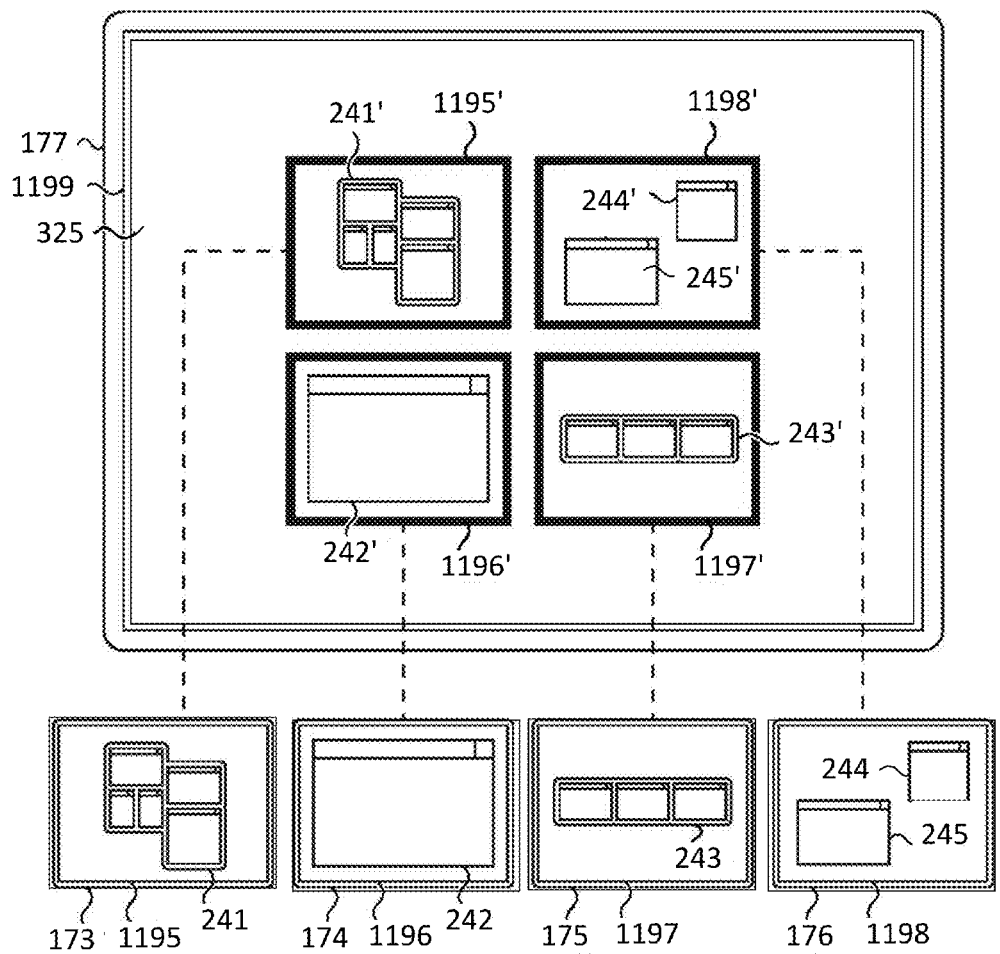
FIG. 24 illustrates an exemplary application of aspects of the present invention.

FIG. 24 illustrates another embodiment of the present invention in which resources of multiple devices are provided in a single desktop environment by proxied or mirrored viewports. In particular, computing devices 173,174, 175,176 each include one or more resources or resource groups. As illustrated, computing device 173 includes viewport 1195 through which resource group 241 is visible; computing device 174 includes viewport 1196 through which resource 242 is visible; computing device 175 includes viewport 1197 through which resource group 243 is visible; and computing device 176 includes viewport 1198 through which resources 244,245 are visible. Each viewport 1195,1196,1197,1198 including associated resources 241, 242,243,244,245 therein are proxied as viewports 1195', 1196',1197',1198' with proxied resources 241',242',243',244', 245' within the single desktop environment 325 as seen through viewport 1199 of computing device 177. Preferably, as changes are made to any of the resources 241,242,243, 244,245 in their respective viewports, the changes will be automatically reflected in the proxied resources 241',242', 243',244',245', in their respective proxied viewports 1195', 1196',1197',1198' presented in the viewport 1199. Similarly, as is otherwise disclosed herein with respect to proxied resources, any changes made to a proxied resource will be automatically reflected in the original resource, provided sufficient access privileges have been granted for such changes. In an implementation of this embodiment, a user of device 177, referred to as the "manager", monitors the activity or progress of other users using respectively devices 173,174,175,176, referred to as the observed devices. In this manner, the manager is able to view the activity and progress of each user as each user interacts with the associated resources of that user's device as seen through the respective viewport of the user's device.

Facilitating Data Tables

Referring to FIG. 25, an embodiment of a computing architecture incorporating aspects of the present invention is illustrated. In this regard, user management can be tied to domain/user accounts in a Windows™ environment. The information and data pertaining to each environment (here referred to as a group), the resource, and the user are maintained in respective database tables, shown generally as table 910,920,930,940,950. The different database tables will have relationships to at least one other table. For example, the window table 910 will include at least information pertaining to the window identity and on-screen position of the resource 247. The user table 920 will include the user identity information for the user associated with the resource 247. Moreover, the table or functionality can be tied to domain or user account information, such as in a Windows™ environment. The group table 930 will include information pertaining to a shared status of the resource, such as for example, an owner identification, name and color.

Preferably, the window table 910 and the user table 920 are related with respect to the active user currently using the resource 247. In this example, an "active user" is the owner of an active window, where a user can only have ownership over one window. Since a given window belongs to a given group, the window table 910 and the group table 930 will be similarly related. The user table 920 and the group table 930 will generally have an access rights relationship, wherein a user will have to be granted privileges as recorded in access table 950, such as reading access, writing access, or a combination thereof, for a given group.

A persistent windows table 940 is used to store information pertaining to windows that are persistent. Windows that are persistent are generally ones that open in a predetermined place, for example within the desktop environment, with predetermined content opened. For example, when a document is opened, the document can be opened in substantially the same position as when it was last open. This can be advantageous when maintaining a group that, for example, includes all office application windows.

Simulating Client Computing on Computing Device

Figure 26:
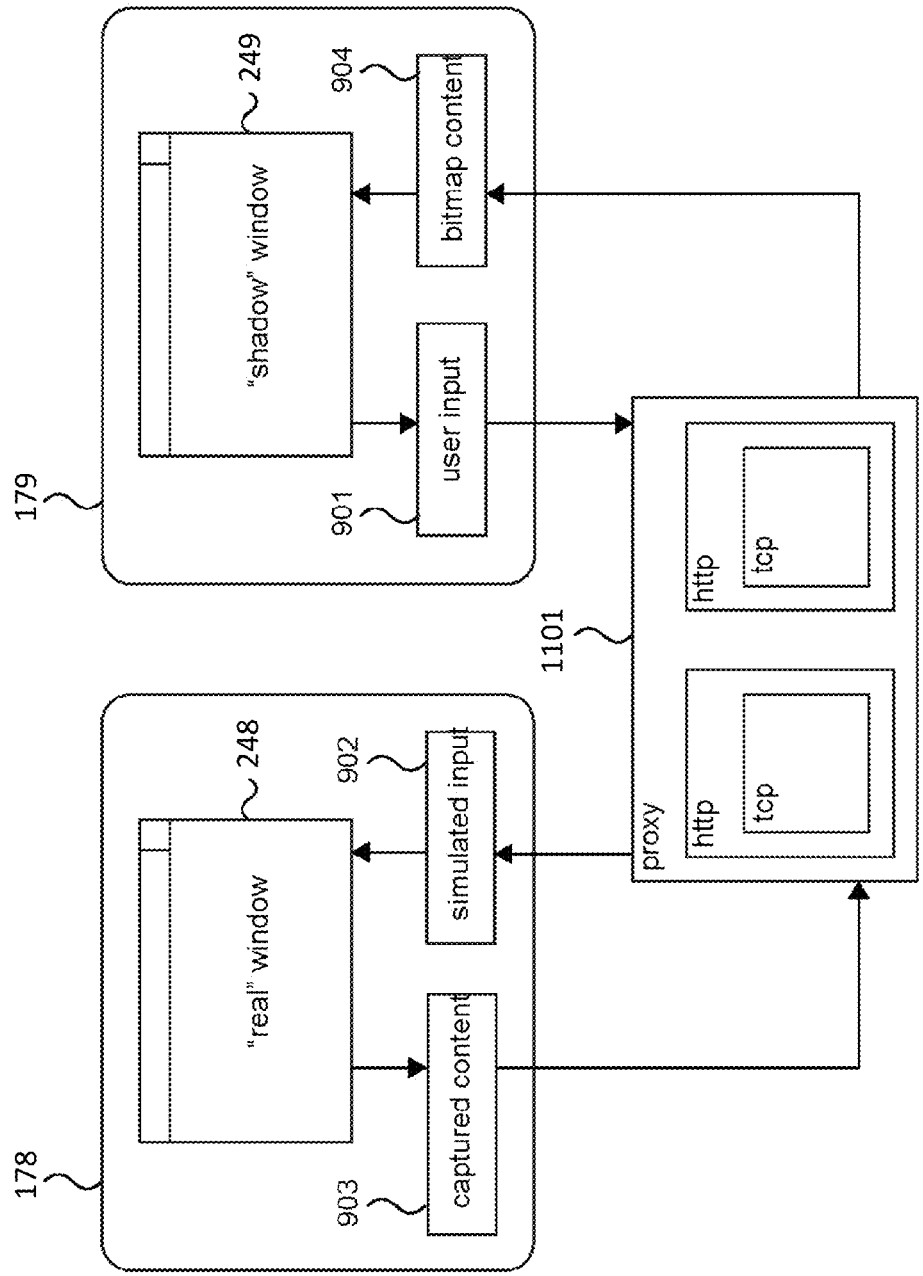
FIG. 26 illustrates another exemplary computing architecture for implementing aspects of the present invention.

FIG. 26 illustrates an embodiment of a computing architecture incorporating aspects of the invention in which client computing on a computing device is simulated. In this example, a computing device 178 and a computing device 179 are coupled together by a network 1101, such as the Internet. The Internet 1101 is configured to transfer data to and between the computing devices 178,179 using HTTP (over TCP). Computing device 178 includes a real window or resource 248 that contains information presented by an application running on computing device 178. The information or content can be in the form of a bitmap of the window, and needs to be transferred to computing device 179. The information is encoded, such as with a codec, and the compressed data is transferred via the Internet 1101 to the computing device 179.

The computing device 179 includes a shadow window or resource 249 that is a real window to the operating system of the computing device 179, but whose contents are controlled. The content data is received from the Internet 1101, decoded and drawn onto the shadow window or resource 249.

Preferably, when the user of the computing device 179 interacts with the content of the shadow window 249, such as for example by clicking with the mouse or touching the touch screen, the input events are transferred to computing device 178 over the Internet 1101. The meaning of the input events to the shadow window 249 are interpreted by computing device 178, as it is computing device 178 that is running the actual application comprising the resource of the real window 248.

In particular, input data 901 received by computing device 179 is communicated over the Internet 1101 and received by computing device 178, where it is passed as simulated user input 902 to the real application window 248. In this sense, the application running on the computing device 178 does not distinguish the simulated user input 902 from one that might be received from a user of computing device 179. Based on the received simulated input 902, computing device 178 updates the contents of the resource represented by the real window 248. The updated information, referred to as captured content 903, then is encoded and sent to computing device 179 as bitmap content 904, which is then passed to the shadow window 249 for updating the view presented therein.

Exemplary Implementations of Use

One example use of a system incorporating aspects of the present invention involves members of a team of designers (e.g., members of a team of designers in charge of designing a car) who invite other members of the team to connect to an environment. In this example, it could be a specific desktop sub-environment of the inviting user that has been created for a joint work session with the other team members. An invitation to share content or the desktop environment may be generated for instance by bringing up a context menu of the sub-environment by right clicking inside the sub-environment and then selecting a menu option corresponding to the action of sharing the desktop sub-environment with other users and then selecting from a list (e.g. in a window that is displayed on the screen as a result of the menu selection) the users with whom the sub-environment in question should be shared with. The list from which the users are selected can also be managed by the team member so that it is possible to add and remove people to and from the list by their user names or other contact details, similarly as in other systems that support real time communication or cooperation with other people, such as Skype™ or Windows Live Messenger™.

As a result of sending the invitation to the team members, the invited team members may receive a notification in their environments, such as for example an activatable link, that they have been invited to open a shared environment with the team member that sent the invitation. In one embodiment, the invitation may be presented as a window where a question is presented asking whether the invitation is to be accepted. Upon accepting the invitation, a sub-environment will be created in the environment shared by the inviting team member. With the shared sub-environment appearing within their environment, one way that a user could move their own windows or resources to the shared environment would be simply by dragging the resources to the shared environment. In this way, all of the invited or connected users that share the same environment will see the same windows appearing in the shared environment. For instance, the team members could all move their own Computer-Aided Design (CAD) windows to the shared environment so that whilst different members of the team may work on different parts of the larger design, the team members could zoom out to see how work progresses on the other parts of the larger design in the windows of the other team members. Alternatively, a game development team might use a shared environment so that a graphics designer might work on the graphical design of an item in a game, such as a sword, in a CAD design application window and when ready with the design, move the item directly to an integrated development environment (IDE) window of the programmer in the same team who could then run the game in a new window in the same environment so that both the graphical designer and the programmer could see how the sword looks in game play.

In another example of the use of a system incorporating aspects of the present invention, two programmers could use a shared desktop environment to cooperatively implement a new feature in some software so that either of the two programmers could work on one of many related source code documents or programming tools arranged in the shared desktop environment. A shared desktop environment according to the aspects of the disclosed embodiments could also be used to support working in various control room or mission control situations or other situations where one or more agents may need to monitor or coordinate actions of others that are working with a number of shared resources. For example, a large shared display device could be used to show the shared desktop environment in zoomed out mode so that the manager or anyone else could take a look at the shared display device to monitor or coordinate actions of individual workers or groups of workers that could generally be focused on their own display devices showing smaller regions of the shared desktop environment or perhaps just individual resources therein. In schools or other teaching situations, teachers could benefit from having pupils with laptops be present in a shared desktop environment during class so the teacher can monitor that the pupils are not active on extra-curricular activities when they should be focused on the topic of the class.

Shared Social Environments

Shared environments according to aspects of the disclosed embodiments could also be used for various social purposes. Friends might use a shared environment for collaborative web searching so that different parties are using different web browsers, yet all parties could at any time easily see what the other parties have found or are looking at. Gamers could use a shared environment to hang out with friends playing video games; school girls could use a shared environment to access FACEBOOK™ cooperatively from multiple different windows with their friends or to temporarily share recent photos and videos with their trusted group of friends without making them permanently available elsewhere, e.g., on FACEBOOK™; a group of artists could hold a public exhibition of their works where resources provided by different artists are automatically promoted by moving them to a more central position in the environment as they receive increasing amounts of interest from visitors of the exhibition (as determined by a system according to the invention based on a measure of interest or activity derived from the number of visits to the resources, amount of time spent on the resources, amount of activity on the resources, characteristics of resource visitation patterns and/or other factors that may be indicative of the amount of interest in or activity on resources); and NBA™ fans could share an environment to keep an eye on multiple concurrent live games.

Exemplary Operating Environment and Architecture

FIG. 26 is a block diagram illustrating an exemplary operating environment for performing disclosed methods in accordance with one or more aspects of the invention. As a preliminary matter, this exemplary operating environment is only an example of an operating environment and is not intended to suggest any limitation as to the scope of use or functionality of operating environments and architectures. Neither should the operating environment be interpreted as having any dependency or requirement relating to any one or combination of components illustrated in the exemplary operating environment.

Indeed, the present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, and distributed computing environments that comprise any of the above systems or devices, and the like.

Furthermore, the processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in distributed computing environments where tasks are performed by remote processing devices that are linked through a communications network. In a distributed computing environment, program modules can be located in both local and remote computer storage media including memory storage devices.

Figure 27:
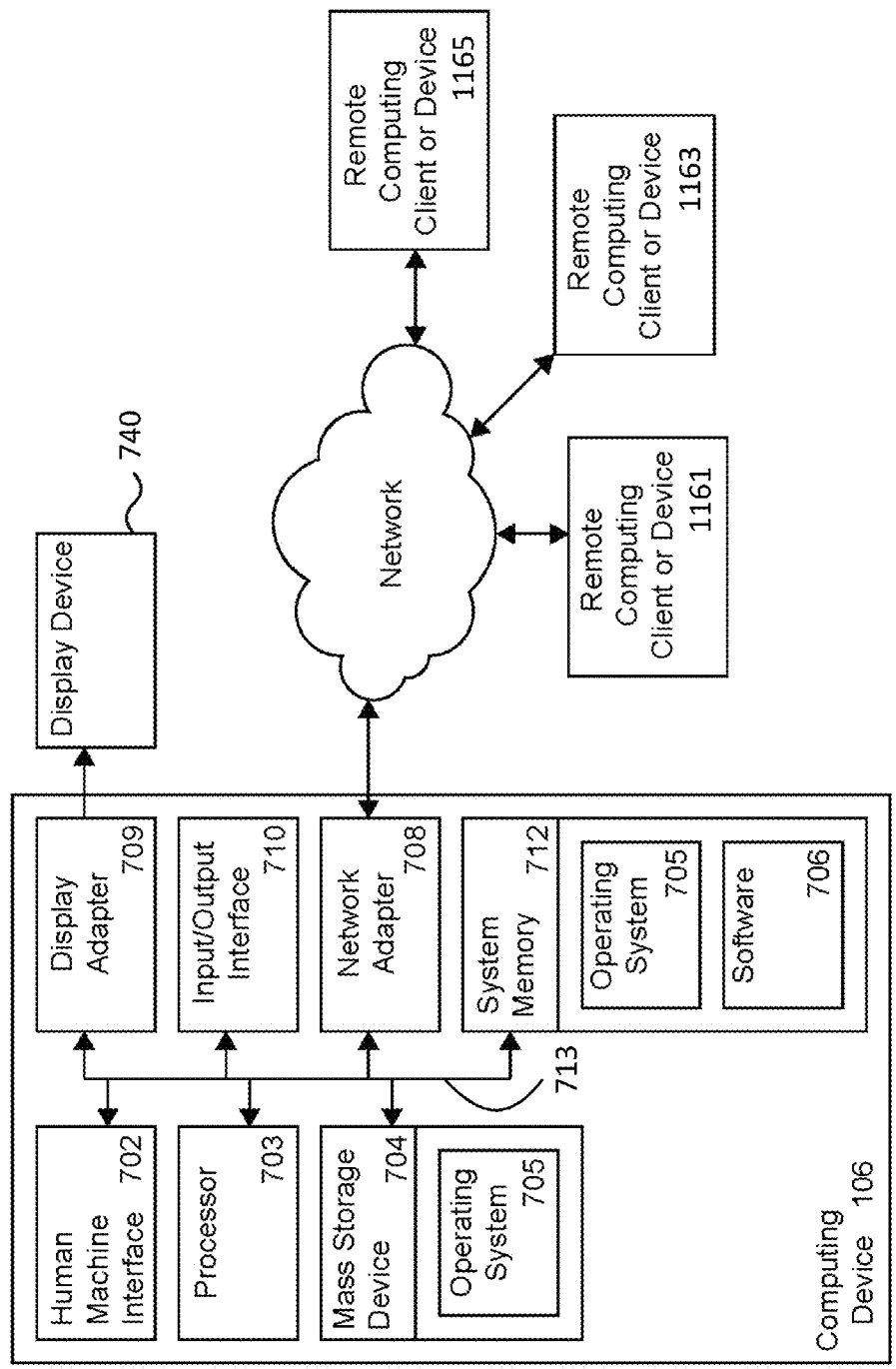
FIG. 27 illustrates a schematic block diagram of a system in which embodiments disclosed herein can be implemented.

Further, one skilled in the art will appreciate that the systems and methods disclosed herein can be implemented via one or more computing devices, generally represented by computing device 106 in FIG. 27. The components of the computing device 106 can comprise, but are not limited to, one or more processors or processing units 703, a system memory 712, and a system bus 713 that couples various system components including the processor 703 to the system memory 712. In the case of multiple processing units 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems—including the processor 703, a mass storage device 704, an operating system 705, a network adapter 708, system memory 712, an Input/Output Interface 710, a display adapter 709, a display device 740, and a human machine interface 702—can be contained within one or more remote computing devices or clients 1161,1163,1165 at physically separate locations, connected through buses of this form, in effect implementing a fully distributed system or distributed architecture.

The computing device 106 typically comprises a variety of computer readable media. Exemplary readable media can be any available media that is non-transitory and accessible by the computing device 106 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as demand control data 707 and/or program modules such as an operating system 705 that is immediately accessible to and/or are presently operated on by the processing unit 703. In one aspect, the system memory 712 contains computer executable code for performing the steps described herein.

In another aspect, the computing device 106 can also comprise other non-transitory, removable/non-removable, volatile/non-volatile computer storage media. By way of example, FIG. 27 illustrates a mass storage device 704 that can provide non-volatile storage of computer code, computer readable instructions, data structures, program modules, and other data for the computing device 106. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and other software 706. Each of the operating system 705 and software 706 (or some combination thereof) can comprise elements of the programming. Data can also be stored on the mass storage device 704. Data can be stored in any of one or more databases known in the art. Examples of such databases comprise, DB2® (IBM Corporation, Armonk, N.Y.), Microsoft® Access, Microsoft® SQL Server, (Microsoft Corporation, Bellevue, Wash.), Oracle®, (Oracle Corporation, Redwood Shores, Calif.), mySQL, PostgreSQL, and the like. The databases can be centralized or distributed across multiple systems.

In another aspect, the user can enter commands and information into a computing device via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 740 can also be connected to the system bus 713 via an interface, such as a display adapter 709. It is contemplated that the computing device 106 can have more than one display adapter 709 and the computing device 106 can have more than one display device 740. For example, a display device 740 can be a monitor, an LCD (Liquid Crystal Display), or a projector. In addition to the display device 740, other output peripheral devices can comprise components such as speakers (not shown) and a printer (not shown), which can be connected to the computing device 106 via Input/Output Interface 710. Any step and/or result of the methods can be output in any form to an output device. Such output can be any form of visual representation, including, but not limited to, textual, graphical, animation, audio, tactile, and the like.

The computing device 106 can operate in a networked environment using logical connections to one or more remote computing devices or clients 1161,1163,1165. Although only three remote computing devices 1161,1163, 1165 are shown in FIG. 27, in alternative embodiments, any suitable number of remote computing devices can be implemented, including more or less than three. Each remote computing device 1161,1163,1165 can be a personal computer, portable computer, a server, a router, a network computer, a vendor's or manufacturer's computing device, a peer device or other common network node, and so on. Logical connections between the computing device 106 and a remote computing device or client 1161,1163,1165 can be made via a local area network (LAN) and a general wide area network (WAN). Such network connections can be through a network adapter 708. A network adapter 708 can be implemented in both wired and wireless environments. Such networking environments are conventional and commonplace in offices, enterprise-wide computer networks, intranets, and other networks 101 such as the Internet. In one embodiment, the aspects of the disclosed embodiments can be implemented in a peer-to-peer (P2P) computing architecture or system.

For purposes of illustration, application programs and other executable program components such as the operating system 705 are illustrated herein as discrete blocks, although it is recognized that such programs and components reside at various times in different storage components of each computing device 1161,1163,1165 and are executed by the data processor(s) thereof. An implementation of software including instructions for carrying out the method and processes described herein can be stored on or transmitted across some form of computer readable media. Any of the disclosed device-implemented methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 28:
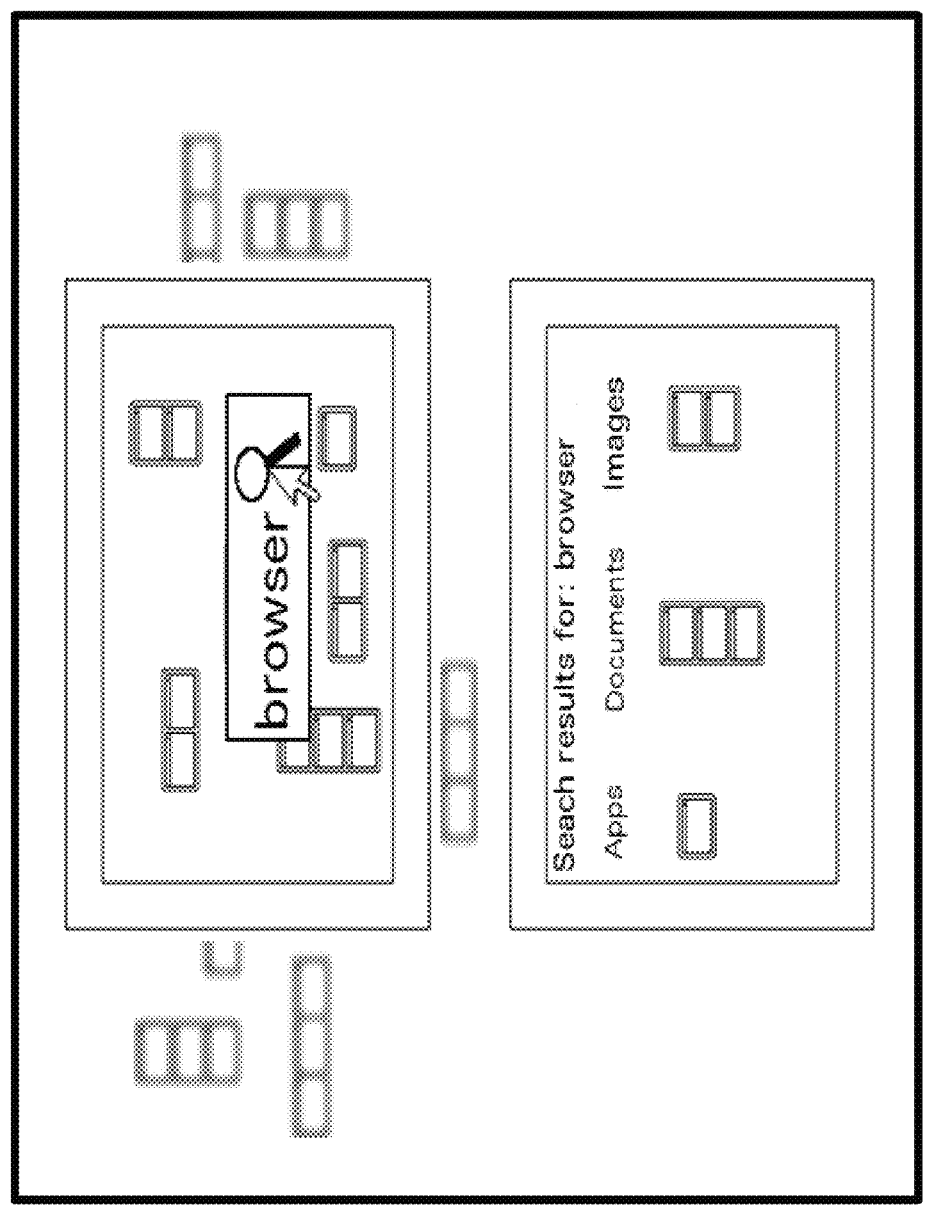
FIG. 28 illustrates a text search feature with respect to virtual desktop environment.

With reference now to FIG. 28, one or more embodiments in accordance with an aspect of the invention include a capability for searching the virtual desktop to locate resources. In this respect, preferably: (1) a user enters a mode where they can enter a search string (e.g., issues a keyboard shortcut; accesses a search field; zooms out; or by some other means); (2) a user starts entering text; and (3) all resources in the view that are determined to match the search string (that determination being based on, e.g., the title, the name of the resource or other properties of the resource such as the name or other properties of the process that created the resource associated with the or user input provided in relation to the resources that can be searched or monitored) is determined as a positive match (matches accurately or with enough similarity (as determined by an arbitrary algorithm that can produce a discrete or probabilistic match result based on a search string) the search string) are visually indicated (e.g. resources that do not provide a positive match are hidden or shown in less intensity or in smaller size and/or resources that provide a positive match are displayed with more intensity or highlighted in larger size or otherwise indicated). In one embodiment, the view the zooms and pans (if and as necessary) to show all the resources that produce a positive match. In another embodiment, indicators of resources that do provide a positive match are indicated (e.g., are highlighted), or indicators of resources that provide a negative match are hidden (for example, indicators in a task bar are hidden).

An example of this feature is illustrated in FIG. 28, wherein a user has entered "browser" and entered a "search" command for the search string "browser", whereupon the search string results are shown grouped according to types, e.g., apps, documents, images, etc. Alternatively, matching groups/resources are brought to view, wherein matched resources within a group are highlighted (not shown). Additionally, the blurred resources in the first image could be indicated at The blurred resources in the first image could be indicated at the edge of the view instead of as disclosed in "indicators of resources outside the view".

Further discussion of this feature is found in Appendix R, incorporated herein by reference.

One or more embodiments in accordance with another aspect of the invention include a capability for easily launching apps. In this regard, when in a zoomed out mode, a clear mouse click on the empty spot in the virtual desktop environment (i.e., Zoowm space) preferably launches an application launcher view that comprises, for example, a simple alphabetical list with which a search tools is provided. Using the app launcher view, a user can choose to launch an application in the installed apps list. Furthermore, a user preferably can search for a quickly launchable application that is not currently in the installed apps list. These applications could be, for instance, cloud based HTML apps that require no installation. After selecting an application from the cloud listing, a user may be prompted for ID and password, and a license purchase may also be handled, in the process for some apps that are not free with public license.

Because of the limited UI space the integrated app store offering in the Zoowm desk may be organized based on artificial intelligence processing and or user profiling on the background service. Furthermore, the application launcher view can be used as a teaser for new experiences and also premium content sales can be channeled through this user interface.

A benefit of this includes a user being able to quickly and easily launch a new application to a pre-defined location in the virtual desktop environment.

Further discussion of this feature is found in Appendix P, incorporated herein by reference.

As described above and as will be appreciated by one skilled in the art, embodiments of the present invention may be configured as a system, method, or computer program product. Accordingly, embodiments of the present invention may be comprised of various means including entirely of hardware, entirely of software, or any combination of software and hardware. Furthermore, embodiments of the present invention may take the form of a computer program product comprising computer-executable instructions contained in non-transitory computer-readable storage medium (e.g., computer software). Any suitable non-transitory computer-readable storage medium may be utilized including hard disks, CD-ROMs, optical storage devices, or magnetic storage devices.

Moreover, embodiments of the present invention have been described above with reference to block diagrams and flowchart illustrations of methods, apparatus, systems, and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the one or more processors 703 discussed above with reference to FIG. 27, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (e.g., one or more processors 703 of FIG. 27 to function in a particular manner, such that the instructions stored in the computer-readable memory produce an article of manufacture including non-transitory computer-readable medium containing computer-executable instructions for implementing the functions specified. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified herein.

Accordingly, blocks of the diagrams and illustrations support combinations of elements for performing the specified functions, combinations of steps for performing the specified functions and computer-executable instructions in non-transitory memory for performing the specified functions. It will also be understood that each block of the diagrams and flowchart illustrations, and combinations of blocks in the diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite or necessarily require an order to be followed by its steps, or it is not otherwise specifically stated in the claims or descriptions that the steps are to be limited to a specific order, it is no way intended that an order be inferred in any respect. This holds for any possible non-express basis for interpretation, including: matters of logic with respect to arrangement of steps or operational flow; plain meaning derived from grammatical organization or punctuation; the number or type of embodiments described in the specification.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit and scope of the invention. Moreover, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Indeed, it will readily be understood by one having ordinary skill in the relevant art ("Ordinary Artisan") that, from the disclosure of the aspects and features of the present inventions, the present inventions have broad utility and application. As should be understood, any embodiment may incorporate only one or a plurality of the aspects of the present inventions and may further incorporate only one or a plurality of the features. Furthermore, any embodiment discussed and identified as being "preferred" is considered to be part of a best mode contemplated for carrying out the present invention. Other embodiments also may be discussed for additional illustrative purposes in providing a full and enabling disclosure of the present inventions. As should be understood, any embodiment may incorporate only one or a plurality of the above-disclosed aspects of the present inventions and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

The term "resource" as is used herein, generally refers to any object or item, groups of objects or items, or any combination thereof, which can be placed and arranged on or in a desktop environment. Examples of "resources" can include, but are not limited to, application windows, or any visual output or indication of an application that provides the user with some type of user interface (which may or may not be interactive) to that or another application. Resources can also include, for example, web documents and resources. Such resources may include files and information. "Environment" is intended to include a large, theoretically infinite, space according to the desktop metaphor, in which "resources" can be arranged. In one embodiment, the extent or size of the environment is defined substantially by the size of an area within which the resources in that environment reside. One example of an "environment" is the desktop space of a computer, generally referred to herein as the desktop environment. Finally, the terms "cooperation", "cooperative" and "collaboration" as used herein, are generally intended to include any form of related activity by multiple parties, e.g., for personal or group benefit, in any context, e.g., private or work.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the present inventions. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A non-transitory computer-readable medium containing computer-executable instructions that, when executed by a processor, perform a method comprising:
   (a) providing at the first computing device a first viewport to a desktop environment of the first computing device;

(b) adding a first resource of the first computing device to the viewport by which first viewport the first resource of the first computing device is able to be viewed and acted upon by a user at the first computing device;

(c) adding a second resource of the first computing device to the viewport by which first viewport the second resource of the first computing device is able to be viewed and acted upon by a user at the first computing device;

(d) communicating, over a network, from the first computing device with a second computing device such that a second viewport to the desktop environment of the first computing device is provided to the second computing device by which second viewport the first and second resources of the first computing device are able to be viewed and acted upon by a user from the second computing device; and (e) concurrently communicating over the network, from the first computing device with a third computing device such that a third viewport to the desktop environment of the first computing device is provided to the third computing device by which third viewport the first and second resources of the first computing device are able to be viewed and acted upon by a user from the third computing device;

(f) wherein the first and second resources of the first computing device,
  (i) are able to be viewed separately from the first computing device through the first viewport at the first computing device,
  (ii) are able to be viewed from the first computing device through the first viewport at the first computing device independently of the viewing of the resources from the second computing device through the second viewport at the second computing device, and
  (iii) are able to be viewed from the first computing device through the first viewport at the first computing device independently of the viewing of the resources from the third computing device through the third viewport at the third computing device;

(g) wherein the first and second resources of the first computing device,
  (i) are able to be viewed separately from the second computing device through the second viewport at the second computing device,
  (ii) are able to be viewed from the second computing device through the second viewport at the second computing device independently of the viewing of resources by the first computing device through the first viewport at the first computing device, and
  (iii) are able to be viewed from the second computing device through the second viewport at the second computing device independently of the viewing of the resources by the third computing device through the third viewport at the third computing device; and (h) wherein the first and second resources of the first computing device,
  (i) are able to be viewed separately from the third computing device through the third viewport at the third computing device,
  (ii) are able to be viewed from the third computing device through the third viewport at the third computing device independently of the viewing of resources by the first computing device through the first viewport at the first computing device, and
  (iii) are able to be viewed from the third computing device through the third viewport at the third computing device independently of the viewing of the resources by the second computing device through the second viewport at the second computing device; and (i) further providing for each respective viewport, a search user interface for text string searching resources of the respective viewport by a user at the computing device of the respective viewport;

(j) wherein the method performed further comprises visually indicating within the first viewport at the first computing device a direction toward a portion of the desktop environment that is currently displayed through the second viewport on the second computing device, and wherein the method performed further comprises visually indicating within the first viewport at the first computing device another direction toward a portion of the desktop environment that is displayed through the third viewport on the third computing device.

2. The computer-readable medium of claim 1, wherein the method performed further comprises adjusting the first viewport at the first computing device such that not all of the resources added to the first viewport are concurrently viewable on a display of the first computing device.

3. The computer-readable medium of claim 2, wherein the first viewport has size, position, and scale properties relative to the desktop environment of the first computing device.

4. The computer-readable medium of claim 3, wherein the method performed further comprises adjusting at least one of size, position, and scale of the first viewport at the first computing device such that not all of the resources added to the first viewport are concurrently viewable on a display of the first computing device.

5. The computer-readable medium of claim 1, wherein the method performed further comprises enabling the resources added to the first viewport to be separately viewed and acted upon from the first computing device.

6. The computer-readable medium of claim 1, wherein one or more resources each comprises an application window at the first computing device.

7. The computer-readable medium of claim 1, wherein a resource is acted upon by causing an application to be executed at the first computing device from one of the other computing devices, execution of the application resulting in an application window that is viewable within the viewport from which the application is caused to be executed.

8. The computer-readable medium of claim 1, wherein the method performed further comprises enabling a resource from one of the other computing devices that is added at the other computing device to the viewport at the other computing device to be viewed and acted upon within the first viewport at the first computing device.

9. The computer-readable medium of claim 1, wherein the method performed further comprises enabling access control from each of the other computing devices to each of the resources added to the first viewport at the first computing device.

10. The computer-readable medium of claim 1, wherein a resource comprises a resource group that itself contains one or more resources.

11. The computer-readable medium of claim 10, wherein the resource group comprises an additional viewport that is provided on another computing device and the resources of the resource group are resources that have been added to the additional viewport.

12. The computer-readable medium of claim 1, wherein the resources comprise application windows, and wherein the method further comprises keeping the application windows seen within the additional viewport from overlapping.

13. The computer-readable medium of claim 1, wherein the resources comprise application windows, and wherein the method further comprises keeping the application windows from being minimized.

14. The computer-readable medium of claim 1, wherein the method performed further comprises visually indicating an amount of interest towards resources viewed through a viewport by arranging the resources in a layout that is indicative of the amount of interest toward each resource.

15. A method of sharing resources by computing devices in a desktop environment, comprising the steps of:
   (a) providing at the first computing device a first viewport to a desktop environment of the first computing device;
   (b) adding a first resource of the first computing device to the first viewport by which first viewport the first resource of the first computing device is able to be viewed and acted upon by a user at the first computing device;
   (c) adding a second resource of the first computing device to the viewport by which first viewport the second resource of the first computing device is able to be viewed and acted upon by a user at the first computing device;
   (d) communicating, over a network, from the first computing device with a second computing device such that a second viewport to the desktop environment of the first computing device is provided to the second computing device by which second viewport the first and second resources of the first computing device are able to be viewed and acted upon by a user from the second computing device; and
   (e) concurrently communicating over the network, from the first computing device with a third computing device such that a third viewport to the desktop environment of the first computing device is provided to the third computing device by which third viewport the first and second resources of the first computing device are able to be viewed and acted upon by a user from the third computing device;
   (f) wherein the first and second resources of the first computing device,
      (i) are able to be viewed separately from the first computing device through the first viewport at the first computing device,
      (ii) are able to be viewed from the first computing device through the first viewport at the first computing device independently of the viewing of the resources from the second computing device through the second viewport at the second computing device, and
      (iii) are able to be viewed from the first computing device through the first viewport at the first computing device independently of the viewing of the resources from the third computing device through the third viewport at the third computing device;
   (g) wherein the first and second resources of the first computing device,
      (i) are able to be viewed separately from the second computing device through the second viewport at the second computing device,
      (ii) are able to be viewed from the second computing device through the second viewport at the second computing device independently of the viewing of resources from the first computing device through the first viewport at the first computing device, and
      (iii) are able to be viewed from the second computing device through the second viewport at the second computing device independently of the viewing of the resources from the third computing device through the third viewport at the third computing device; and
   (h) wherein the first and second resources of the first computing device,
      (i) are able to be viewed separately from the third computing device through the third viewport at the third computing device,
      (ii) are able to be viewed from the third computing device through the third viewport at the third computing device independently of the viewing of resources from the first computing device through the first viewport at the first computing device, and
      (iii) are able to be viewed from the third computing device through the third viewport at the third computing device independently of the viewing of the resources from the second computing device through the second viewport at the second computing device; and
   (i) further providing for each respective viewport, an application launcher view user interface for launching applications, which is viewable by clicking on an open space of a virtual desktop as seen through the respective viewport, and by which launchable applications are searchable; and
   (j) wherein the method further comprises visually indicating within the first viewport at the first computing device a direction toward a portion of the desktop environment that is currently displayed through the second viewport on the second computing device, and wherein the method further comprises visually indicating within the first viewport at the first computing device another direction toward a portion of the desktop environment that is displayed through the third viewport on the third computing device.

16. The method of claim 15, wherein the first and second resources are able to be individually acted upon from the first computing device through the first viewport at the first computing device, are able to be individually acted upon from the second computing device through the second viewport at the second computing device, and are able to be individually acted upon from the third computing device through the third viewport at the third computing device.

17. The method of claim 15, further comprising adjusting at least one of size, position, and scale of the first viewport at the first computing device such that not all of the resources added to the first viewport at the first computing device are concurrently viewable on a display of the first computing device; adjusting at least one of size, position, and scale of the second viewport at the second computing device such that not all of the resources added to the first viewport at the first computing device are concurrently viewable on a display of the second computing device; and adjusting at least one of size, position, and scale of the third viewport at the third computing device such that not all of the resources added to the first viewport at the first computing device are concurrently viewable on a display of the third computing device.

18. The method of claim 17, wherein the first computing device comprises a personal computer, wherein the second computing device comprises a mobile communication device, and wherein the third communication device comprises a tablet.

19. The method of claim 18, wherein at least one of the computing devices comprises a touch screen mobile computing device.

* * * * *